(12) United States Patent
Inoue

(10) Patent No.: US 11,847,373 B2
(45) Date of Patent: Dec. 19, 2023

(54) SERVER, CONTROL METHOD, STORAGE MEDIUM, AND PRINTING SYSTEM

(71) Applicant: CANON KABUSHIKI KAISHA, Tokyo (JP)

(72) Inventor: Go Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/820,331

(22) Filed: Aug. 17, 2022

(65) Prior Publication Data

US 2022/0391156 A1   Dec. 8, 2022

Related U.S. Application Data

(63) Continuation of application No. 17/227,076, filed on Apr. 9, 2021, now Pat. No. 11,461,064.

(30) Foreign Application Priority Data

Apr. 16, 2020 (JP) ................. 2020-073487

(51) Int. Cl.
G06F 3/12 (2006.01)
(52) U.S. Cl.
CPC ......... *G06F 3/1268* (2013.01); *G06F 3/1204* (2013.01); *G06F 3/1232* (2013.01); *G06F 3/1289* (2013.01); *G06F 3/1292* (2013.01)
(58) Field of Classification Search
None
See application file for complete search history.

(56) References Cited

U.S. PATENT DOCUMENTS

2019/0317702 A1 * 10/2019 Kaneda ............... G06F 3/1285
2020/0226436 A1 * 7/2020 Ozawa ................ H04N 1/6027

FOREIGN PATENT DOCUMENTS

JP   2020004254 A   1/2020
JP   2020047244 A   3/2020

* cited by examiner

*Primary Examiner* — Frantz Bataille
(74) *Attorney, Agent, or Firm* — Canon U.S.A., Inc. IP Division

(57) ABSTRACT

A server providing a cloud print service includes at least one processor that executes a set of instructions, when executed, causing the server to perform operations including acquiring attribute information indicating printing capabilities of a printing apparatus when the printing apparatus is registered as an output destination printer, registering output destination printer information by associating the acquired attribute information with information indicating an output destination, and transmitting, in a case where a request for acquiring capability information about the registered output destination printer is received, the attribute information about the registered output destination printer to a client terminal as a response to the request, wherein in the registering, even in a case where the acquired attribute information about the printing apparatus includes an attribute that is not supported by the cloud print service, the attribute information is registered as the output destination printer information without discarding the attribute information.

11 Claims, 18 Drawing Sheets

SEQUENCE DIAGRAM ILLUSTRATING CLOUD PRINT SERVICE OF RELATED ART

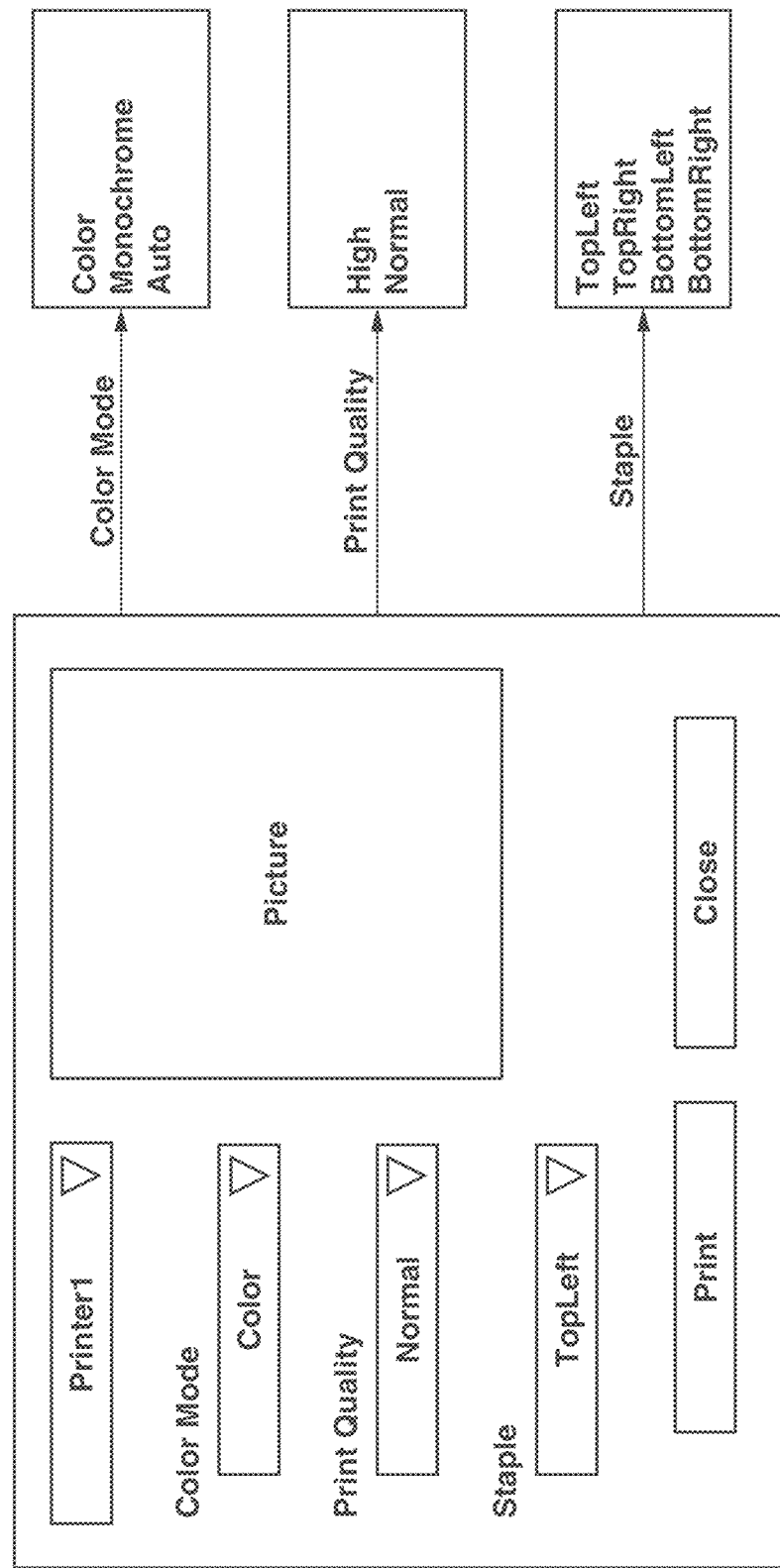

FIG.4

| Printer Setting | | | IPP Attribute | | PRINTING APPARATUS 101 | CPS 102 | CLIENT TERMINAL 103 | CLIENT TERMINAL 104 | CLIENT TERMINAL 105 |
|---|---|---|---|---|---|---|---|---|---|
| | attribute | value | attribute | value | ✓ | ✓ | ✓ | ✓ | ✓ |
| standard | color mode | color | print-color-mode-supported | color | ✓ | ✓ | ✓ | ✓ | ✓ |
| | | monochrome | | monochrome | ✓ | ✓ | ✓ | ✓ | ✓ |
| | | auto | | auto | ✓ | ✓ | ✓ | ✓ | ✓ |
| | print quality | high | print-quality-supported | high | ✓ | ✓ | ✓ | ✓ | ✓ |
| | | normal | | normal | ✓ | ✓ | ✓ | ✓ | ✓ |
| | | draft | | draft | ✓ | ✓ | × | ✓ | ✓ |
| | staple | none | finishing-supported | none (3) | ✓ | ✓ | ✓ | ✓ | × |
| | | topleft | | staple-top-left (20) | ✓ | ✓ | ✓ | ✓ | × |
| | | topright | | staple-top-right (22) | ✓ | ✓ | ✓ | ✓ | × |
| | | bottomleft | | staple-bottom-left (21) | ✓ | ✓ | ✓ | ✓ | × |
| | | bottomright | | staple-bottom-right (23) | ✓ | ✓ | ✓ | ✓ | × |
| | | dual-left | | staple-dual-left (28) | ✓ | ✓ | ✓ | ✓ | × |
| | | dual-right | | staple-dual-right (30) | ✓ | ✓ | ✓ | ✓ | × |
| | | dual-top | | staple-dual-top (29) | ✓ | ✓ | ✓ | ✓ | × |
| | | dual-bottom | | staple-dual-bottom (31) | ✓ | ✓ | ✓ | ✓ | × |
| | number up | 1 | number-up-supported | 1 | ✓ | × | ✓ | ✓ | × |
| | | 2 in 1 | | 2 | ✓ | × | ✓ | ✓ | × |
| | | 4 in 1 | | 4 | ✓ | × | ✓ | ✓ | × |
| | emphasize thin lines | ON | emphasize-thin-lines-supported | TRUE | ✓ | × | × | ✓ | × |
| | | OFF | | FALSE | ✓ | × | × | ✓ | × |
| vendor unique | color adjust | none | color-adjust-supported | none | ✓ | × | × | ✓ | × |
| | | strengthen blue | | strengthen blue | ✓ | × | × | ✓ | × |
| | | strengthen red | | strengthen red | ✓ | × | × | ✓ | × |
| | | strengthen yellow | | strengthen yellow | ✓ | × | × | ✓ | × |

FIG.14A

CAPABILITY REGISTRATION PACKET FROM PRINTER TO CLOUD
PRINT SERVICE IN THIS PROPOSAL

Operation: Output-Device-Attribute Request
Printer-attribute-tag:
  Color-mode-supported: auto, monochrome, color
  Print-quality-supported: high , normal , draft
  finishing-supported: 3, 20, 21, 22, 23, 28, 29, 30, 31
  number-up-supported: 1, 2, 4
  emphasize-thin-line-supported: true, false
  color-adjust-supported: strengthen blue, strengthen red, strengthen yellow

FIG.14B

CAPABILITY ACQUISITION REQUEST RESPONSE PACKET FROM CLOUD
PRINT SERVICE TO CLIENT TERMINAL IN THIS PROPOSAL

Operation: Get-Printer-Attributes Response
Status code: successful-ok
Printer-attribute-tag:
  Color-mode-supported: auto, monochrome, color
  Print-quality-supported: high , normal , draft
  finishing-supported: 3, 20, 21, 22, 23, 28, 29, 30, 31
  number-up-supported: 1, 2, 4
  emphasize-thin-line-supported: true, false
  color-adjust-supported: strengthen blue, strengthen red, strengthen yellow

FIG.14C

CAPABILITY NOTIFICATION RESPONSE FROM CLOUD PRINT SERVER
TO IMAGE FORMING APPARATUS IN THIS PROPOSAL

Operation: Output-Device-Attribute Response
Status code: successful-ok
Status Message: "Some attributes are not supported by the cloud print service. but un-supported attribute was registered."

FIG.17A

PRINT JOB TRANSMISSION PACKET TO CLOUD PRINT SERVICE FROM
CLIENT TERMINAL THAT SUPPORTS ATTRIBUTES UNIQUE TO VENDOR

Operation: Create-Job Request
Job-attributes-tag:
 Color-mode: color
 Print-quality: draft
 finishing: 28
 number-up: 2
 emphasize-thin-lines: true
 color-adjust: strengthen blue

FIG.17B

PRINT JOB TRANSMISSION PACKET FROM CLOUD PRINT
SERVICE TO PRINTER

Operation: Fetch-Job Response
Status code: successful-ok
Job-attributes-tag:
 Color-mode: color
 Print-quality: draft
 finishing: 28
 number-up: 2
 emphasize-thin-lines: true
 color-adjust: strengthen blue

SERVER, CONTROL METHOD, STORAGE MEDIUM, AND PRINTING SYSTEM

CROSS-REFERENCE TO RELATED APPLICATIONS

This application is a Continuation of U.S. patent application Ser. No. 17/227,076, filed Apr. 9, 2021, which claims the benefit of Japanese Patent Application No. 2020-073487, filed Apr. 16, 2020, both of which are hereby incorporated by reference herein in their entirety.

BACKGROUND

Field of the Disclosure

The present disclosure relates to a server, a control method, a storage medium, and a printing system for providing a print service.

Description of the Related Art

In cloud print services that have been widely used in recent years, a print job is input and then transmitted to a printing apparatus via the cloud, as discussed in Japanese Patent Application Laid-Open No. 2012-133489. In such a printing system, an administrator first registers a printing apparatus in the cloud print service to which the administrator belongs. In addition, cloud print services provided by information technology (IT) vendors and the like are desired to be compatible with various types of printing apparatuses in view of user-friendliness. In such cloud print services, capability information defined in a general-purpose printing technique, such as an Internet Printing Protocol (IPP), is acquired from a registered printing apparatus, and the capabilities of the printing apparatus are managed.

Subsequently, the administrator sets a user to be permitted to use the printing apparatus. The user permitted to use the printing apparatus accesses the cloud print service from a client terminal, such as a personal computer (PC), and selects a printing apparatus to be used for printing from among the printing apparatuses registered on the cloud print service. Then, the cloud print service notifies the client terminal of the capability information about the printing apparatus. In this case, capability information that is not supported by a print client of the client terminal is discarded.

The client terminal manages the capability information about the output destination printer based on the notified capability information. Upon receiving a user operation for changing print settings, the client terminal generates and displays a print setting screen based on the managed capability information. This enables the user to make print settings on the client terminal depending on the capabilities of the printing apparatus. Then, when a printing instruction is made by a user of an information processing apparatus, the information processing apparatus transmits print data to the cloud print service. The cloud print service stores the received print job in a storage. The printing apparatus acquires the print job stored in the cloud print service, and executes printing. Printing is executed via the cloud in a series of processing described above.

Examples of cloud print services include Google Cloud Print®, Microsoft Hybrid Cloud Print®, and uniFLOW Online®.

SUMMARY

According to embodiments of the present disclosure, a server providing a cloud print service includes at least one memory that stores a set of instructions and at least one processor that executes the instructions, when executed, causing the server to perform operations including acquiring attribute information indicating printing capabilities of a printing apparatus when the printing apparatus is registered as an output destination printer for the cloud print service, registering output destination printer information by associating the acquired attribute information with information indicating an output destination, and transmitting, in a case where a request for acquiring capability information about the registered output destination printer from a client terminal is received, the attribute information about the registered output destination printer to the client terminal as a response to the request, wherein in the registering, even in a case where the acquired attribute information about the printing apparatus includes an attribute that is not supported by the cloud print service, the attribute information is registered as the output destination printer information without discarding the attribute information.

Further features of the present disclosure will become apparent from the following description of exemplary embodiments with reference to the attached drawings.

BRIEF DESCRIPTION OF THE DRAWINGS

FIG. 3 illustrates an example of a print setting screen for the cloud print service of the related art.

FIG. 4 is a table illustrating differences in supported print capabilities.

FIGS. 14A, 14B, and 14C illustrate examples of transmission/reception packets indicating a request for capability information and a response.

FIGS. 17A and 17B illustrate examples of attribute information corresponding to a print job.

DESCRIPTION OF THE EMBODIMENTS

Figure 1:
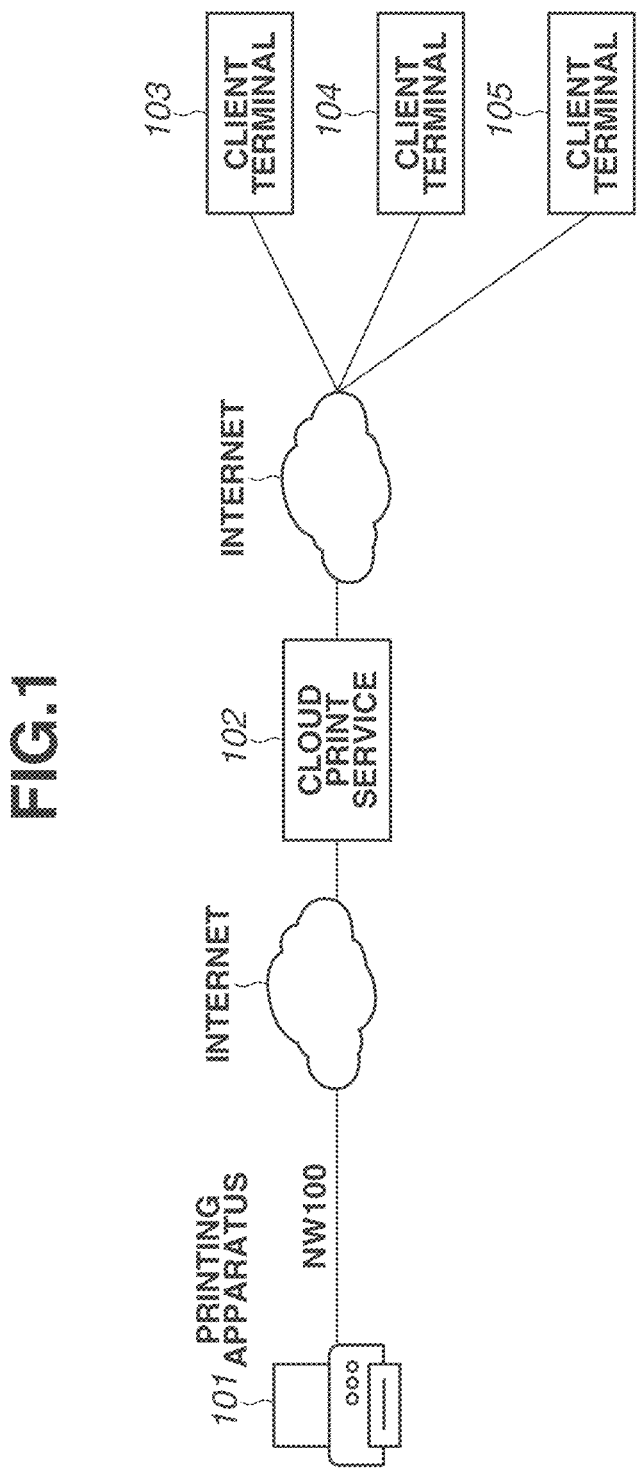
FIG. 1 is a diagram illustrating an example of a printing system.

Exemplary embodiments of the present disclosure will be described below.

First, the premises will be described. In recent years, more and more organizations and companies are choosing to use client terminals of a plurality of operating system (OS) vendors (e.g., Windows® OS, macOS®, or Chrome® OS). In this case, capabilities that are supported by each print client may vary depending on the type of the client terminal. For example, a print client for an OS having a large share in the market is frequently updated and thus the capabilities supported by the client are improved, while a client for an OS having a small share in the market is updated less often and thus the capabilities supported by the client may be at a low level. In addition, for example, a print client for a client terminal, such as a mobile terminal, which is not often required to make complicated print settings, may be configured to intentionally lower the support capabilities such that a user can intuitively make settings.

It is also generally known that when capability information about a printing apparatus is acquired, unsupported capability information is discarded. Accordingly, if registration processing is simply performed during registration of a printing apparatus on a cloud print service (hereinafter also referred to as "CPS"), capability information that is not supported by the CPS is discarded and then the printer is registered.

Each print client can be improved by upgrading or the like and can additionally support a print attribute that has not been supported. However, if capabilities that are not supported by the CPS are discarded during registration of a printer on the CPS and then the printer is registered, even print settings corresponding to print attributes that are supported by both the printing apparatus and the updated client cannot be made in some cases. In addition, every time a print attribute supported by the print client is added, an updating operation, such as an operation for expanding the print attributes supported by the CPS and reregistering the printing apparatus on the CPS, may need to be performed. This operation requires an excessive amount of time and labor for an administrator or the like, and thus this operation is impractical. Further, it is also possible to construct a mechanism for setting items in addition to standard items by expanding print settings provided by a print client using a print extension application. Even in such a case, if attributes that are not supported by the CPS are discarded, items other than the standard items cannot be acquired from the CPS.

In view of the above-described premises, an exemplary embodiment of the present disclosure provides a mechanism in which capability information that is not supported by a cloud print service is registered during registration of a printing apparatus on the cloud print service, and a notification indicating the capabilities of the print apparatus is appropriately sent to a client. This mechanism will be described in detail below with reference to the drawings.

The following exemplary embodiments are not intended to limit the disclosure, and not all combinations of features described in the exemplary embodiments are essential to the solving means of the disclosure.

A configuration of a printing system according to a first exemplary embodiment will now be described with reference to FIG. 1. The printing system according to the present exemplary embodiment includes a printing apparatus 101, client terminals 103 to 105, and a cloud print service (hereinafter also referred to as "CPS") 102. The printing apparatus 101 communicates with the CPS 102 on the Internet via a network 100. The network 100 may be configured using a combination of a communication network, such as a local area network (LAN) or a wide area network (WAN), a cellular network (e.g., Long Term Evolution (LTE) or fifth generation mobile communication system (5G)), a wireless network conforming to Institute of Electrical and Electronics Engineers (IEEE) 802.11, and the like. In other words, the network 100 may have any configuration as long as data reception and transmission can be performed via the network 100 and may adopt any communication method for physical layers. The client terminals 103 to 105 also communicate with the CPS 102 on the Internet via a communication network or a cellular network.

The printing apparatus 101 includes a scanning function for transmitting data based on an image obtained by scanning information using a scanner to the outside of the printing apparatus 101, a printing function for printing the image on a sheet, such as paper, based on a print job received from an external apparatus, and a copying function. Further, the printing apparatus 101 can receive a print job via the CPS 102 and execute printing. The present exemplary embodiment illustrates an example where a multi-function peripheral (MFP) including a plurality of functions is used as an example of the printing apparatus 101. However, the present exemplary embodiment is not limited to this example. For example, a single function peripheral (SFP) including only the printing function may be used. Further, the present exemplary embodiment illustrates an example where printing is executed on a sheet, such as paper. However, the present exemplary embodiment is not limited to this example. The present exemplary embodiment can also be applied to printing control processing in, for example, three-dimensional (3D) printing for forming a three-dimensional object based on three-dimensional shape data.

The CPS 102 receives a print job from a client terminal, such as the client terminal 103, 104 or 105, and stores the print job. Then, the CPS 102 sends a notification that the print job is input to the printing apparatus 101 that is registered on the CPS 102. The printing apparatus 101 that has received the notification acquires the print job and executes print processing.

Description of Cloud Print Service of Related Art

Figure 2:
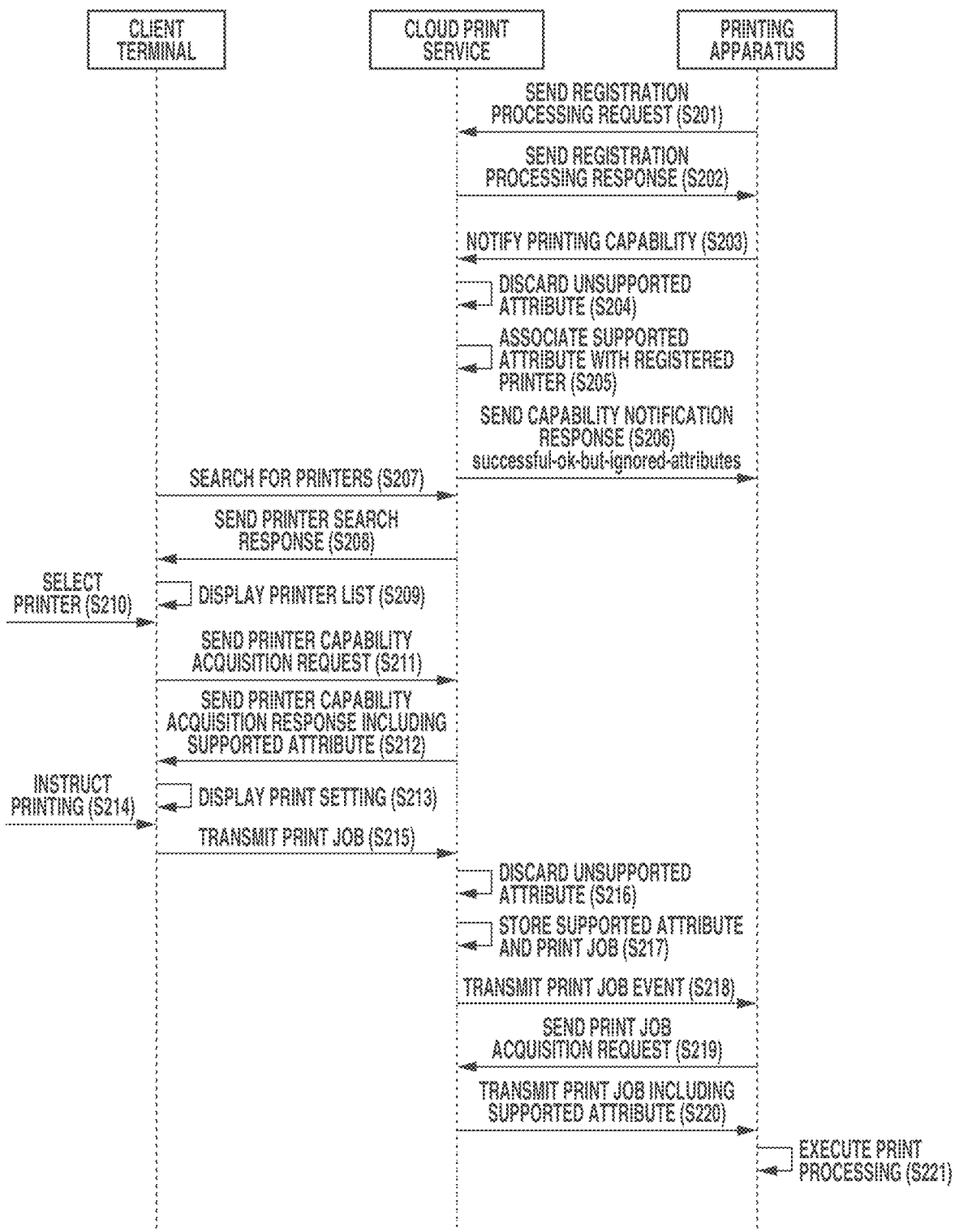
FIG. 2 is a sequence diagram illustrating an operation of a cloud print service (CPS) of a related art.

Next, printer registration and printing in a generally known CPS will be described with reference to FIGS. 2 and 3. FIG. 2 is a sequence diagram illustrating an example of printer registration and printing sequences in the general CPS. FIG. 3 illustrates an example of a print setting screen to be displayed when print data is input to the CPS from the client terminal.

First, in steps S201 and S202, a printing apparatus is registered on the CPS based on an operation performed by a user such as an administrator. When the processing of steps S201 to S202 is executed and a cloud printer is registered on the CPS, then in step S203, the printing apparatus notifies the CPS of attribute information indicating printing capabilities. The printing apparatus that has received the attribute information in step S203 analyzes the attribute information. Specifically, in step S204, the CPS discards a print attribute that is not supported by the CPS and extracts a print attribute that is supported by the CPS. Then in step S205, the CPS associates the supported print attribute with the registered printer. The processing of steps S201 to S204 enables registration of an output destination printer having capabilities equivalent to those of the printing apparatus on the CPS. The present exemplary embodiment assumes a case where the CPS functions as an Internet Printing Protocol (IPP) proxy for relaying the print job received from the client terminal to the printing apparatus. In this case, attribute information that is not supported by the CPS (incomprehensible attribute information) is discarded and printing via the cloud is implemented by using only supported attribute information in accordance with the IPP rules.

Next, in step S206, the CPS sends a notification indicating the capability update result. Step S206 illustrates a case where attribute information that is supported by the printing apparatus but is not supported by the CPS is present. In this case, a status code (successful-ok-but-ignored-attributes) indicating that a part of the attribute information is ignored is sent as a response.

Next, print processing to be executed from the client terminal will be described. Upon detecting that a printer search instruction is issued by the user, in steps S207 to S209, the client terminal searches for peripheral printers and printers on the CPS and displays a list of printers that can be used by the user. The cloud printer search is performed as follows. For example, the client terminal transmits account information about the user who has logged in to the client terminal to the CPS. The CPS extracts output destination printers that can be used by the user and are managed on the CPS. Then, in step S208, the CPS notifies the client terminal of the extracted output destination printers. In step S209, the client terminal that has received the notification displays a list of the printers based on the notification.

Next, in step S210, the client terminal receives a user operation for selecting a printer. In a case where the selected printer is one of the printers managed on the CPS and the printer is not registered in the client terminal, then in steps S211 and S212, processing for registering the output destination printer on the client terminal is performed. In the registration processing, processing for registering the output destination printer for executing printing via the CPS is executed on a print framework provided by the OS of the client terminal. For example, when Windows® is used as the OS, print queue generation processing and printer driver configuration processing are performed.

Then, in step S213, the client terminal displays the print setting screen corresponding to the registered output destination printer, and receives a change of print settings performed by a user operation. Upon detecting a user operation for starting printing, in step S214, the client terminal generates a print job based on a printing target file and print settings, and transmits the print job to the CPS.

In steps S215 to S217, the CPS discards unsupported attribute information from the attribute information indicating the print settings included in the print job, and stores the print job including supported attribute information and print data included in the job in a storage area. Then, in step S218, the CPS transmits, to the printing apparatus, an event (notification) indicating that the print job is input. The notification may be directly sent to the printing apparatus from the CPS, or may be made in such a manner that the printing apparatus periodically makes an inquiry about an event occurrence status and the CPS sends an event as a response to the inquiry.

In step S219, the printing apparatus that has received the event transmits a request for acquiring the print job to the CPS. In step S220, the CPS that has received the request transmits the print job including the supported attribute information to the printing apparatus that has transmitted the request. Lastly, in step S221, the printing apparatus that has received the print job prints an image on a sheet based on the print job, and thus a series of processing is terminated.

In the processing of the related art described above with reference to FIG. 2, when capability information about the printing apparatus is acquired, unsupported capability information is discarded. Accordingly, in the case of registering the printing apparatus on the CPS, if the registration processing is simply performed, it is considered that the printer is registered while capability information that is not supported by the CPS is discarded.

FIG. 4 is a table illustrating capabilities that are supported by the client terminals 103 to 105, the CPS 102, and the printing apparatus 101 according to the present exemplary embodiment. For convenience of illustration, some of the capabilities are extracted and displayed. In practice, not only these capabilities, but also capabilities indicating sheet sizes that are supported by the printing apparatus 101 and information indicating the type of sheets supported by the printing apparatus 101 are included. In addition, for example, capabilities indicating the sizes of data that can be received are also included.

The printing apparatus 101 supports all attributes listed in FIG. 4. The present exemplary embodiment assumes a case where the printing apparatus 101 supports standard attributes defined in standards, such as Request For Comments (RFC), and vendor unique attributes that are not defined in the standards. FIG. 4 illustrates attribute information based on the IPP as examples of standard attributes.

The attribute information will be described in detail. A "print-color-mode-supported" attribute is attribute information about a color mode. This attribute can take three types of values, i.e., "auto", "color", and "monochrome". The corresponding print setting is referred to as a "color mode" setting, and this setting can take values of "auto", "color", and "monochrome". The "color mode" is a setting for selecting a color setting for print output. When "color" is selected, a color output is performed. When "monochrome" is selected, a monochrome output is performed. When "auto" is selected, the printing apparatus 101 performs a color output or a monochrome output.

A "print-quality-supported" attribute is attribute information about a print quality. This attribute can take three types of values, i.e., "high", "normal", and "draft". The corresponding print setting is referred to as a "print quality" setting, and this setting can take values of "high", "normal", and "draft". The "print quality" setting is a setting for selecting the amount of toner to be consumed. When "high" is selected, printing is executed with a large amount of toner to be consumed. When "normal" is selected, printing is executed with a normal amount of toner to be consumed. When "draft" is selected, printing is executed with a less amount of toner to be consumed.

A "number-up-supported" attribute is attribute information about N-up printing. This attribute can take numerical values, and indicates that pages corresponding to a designated value can be collectively printed on one printing surface of a sheet. For example, when values "1, 2, 4" are stored, "1-in-1", "2-in-1", and "4-in-1" can be set in the print setting.

A "finishing-supported" attribute is attribute information about post-processing. This attribute can take numerical values, and values corresponding to finishing information that is supported by the printing apparatus 101 are stored. For example, "20" is associated with "staple-top-left" and "22" is associated with "staple-top-right". These values are treated as "staple" setting values in the print setting, and enable setting of, for example, "stapling at an upper left position" and "stapling at an upper right position".

An "emphasize-thin-lines-supported" attribute is an example of vendor unique attributes, and is attribution information about how to treat thin lines. This attribute can take values of "true" and "false". The print setting corresponding to the attribute information is referred to as an "emphasize thin lines" setting. When "true" is selected, printing in which thin lines are emphasized is executed. When "false" is selected, printing in which thin lines are not emphasized is executed. This setting is used to, for example, prevent a phenomenon in which some of thin lines are not fully reproduced or are discontinuously formed in an inexpensive printing apparatus with a low printing resolution or the like.

Similarly, a "color-adjust-supported" attribute is a vendor unique attribute, and is a setting for special printing to execute printing by strengthening a specific color. This attribute can take values of "strengthen blue", "strengthen yellow", and "strengthen red". The corresponding print setting is referred to as a "color adjust" setting. In this setting, "none", "strengthen blue", "strengthen yellow", and "strengthen red" can be set.

The printing apparatus 101 supports all the pieces of attribute information described above. However, at this time, the CPS 102 does not support an attribute corresponding to a function for stapling documents at two positions. On the other hand, a print client installed in the client terminal 103 is improved by upgrading and additionally supports the print attribute (e.g., the function for stapling documents at two positions) that has not been supported.

In view of the above-described circumstances, in the case of registering a printer on the CPS, if control processing for simply registering the printer while discarding capabilities that are not supported by the CPS is performed, the following issue is raised. That is, the print setting corresponding to the print attribute that is actually supported by both the printing apparatus and the updated client cannot be made in printing via the CPS.

A specific example will be described with reference to FIG. 3. FIG. 3 illustrates a screen to be displayed when print settings are made by the print client having capabilities equivalent to those of the client terminal 103. When the simple registration processing is performed like in the related art, in the registration processing of steps S203 to S205, the output destination printer is registered on the CPS in a state where an attribute value for stapling documents at two positions and attribute information about N-up printing are discarded. The print client acquires the capability information obtained by performing rounding processing on the CPS in the processing of steps S211 and S212. This may cause an issue that the setting for N-up printing and complicated stapling settings that are actually supported by both the printing apparatus and the client cannot be made via the print setting screen illustrated in FIG. 3. In addition, every time a print attribute supported by the print client is added, the print attributes supported by the CPS are also expanded, and an updating operation, such as an operation for reregistering the printing apparatus on the CPS, may need to be performed. This operation requires an extra amount of time and labor for the administrator, and thus this operation is impractical.

In view of the above-described issues, in the present exemplary embodiment, control processing is executed such that, in the case of registering the printing apparatus on the CPS, capability information that is not supported by the CPS is also registered as capability information about the printing apparatus and a notification indicating the capabilities of the printing apparatus is appropriately sent to the client. This processing will be described in detail below.

Hardware Configuration of Printing Apparatus 101

Figure 5:
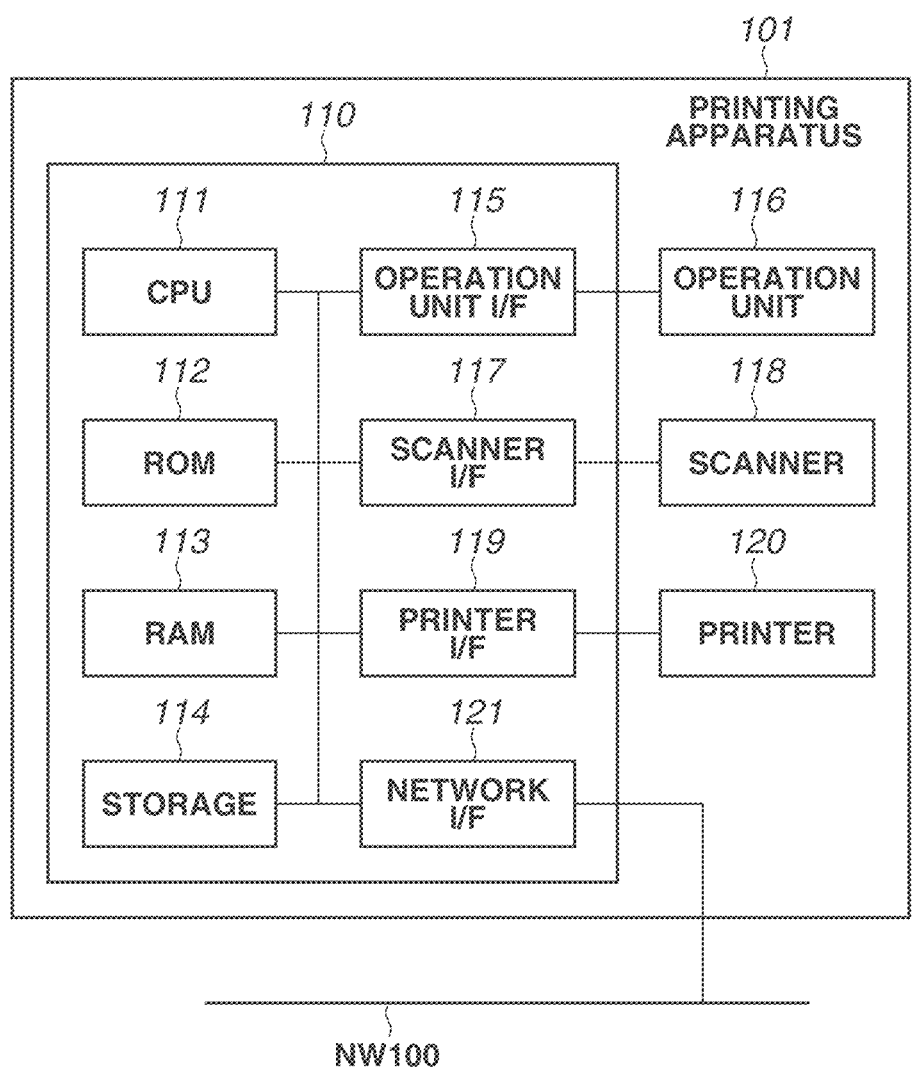
FIG. 5 is a block diagram illustrating an example of a hardware configuration of a printing apparatus.

First, the printing apparatus 101 will be described with reference to FIG. 5. FIG. 2 is a block diagram illustrating a hardware configuration of the printing apparatus 101. The printing apparatus 101 includes a scanning function for scanning an image on a sheet, and a file transmission function for transmitting the scanned image to an external communication apparatus. The printing apparatus 101 also includes a printing function for printing an image on a sheet. The printing apparatus 101 also includes a function for receiving a print job from the CPS 102 and executing printing based on the received print job.

A control unit 110 including a central processing unit (CPU) 111 controls the overall operation of the printing apparatus 101. The CPU 111 reads out control programs stored in a read-only memory (ROM) 112 or a storage 114, and performs various control processing such as printing control and scanning control. The ROM 112 stores control programs that can be executed by the CPU 111. A random access memory (RAM) 113 is a main storage memory to be accessed from the CPU 111, and is used as a work area or a temporary storage area for loading various control programs. The storage 114 stores print data, image data, various programs, and various setting information. Thus, the hardware modules, such as the CPU 111, the ROM 112, the RAM 113, and the storage 114, constitute a computer.

The printing apparatus 101 according to the present exemplary embodiment is configured to execute each process in flowcharts to be described below in such a manner that a single CPU 111 uses a single memory (RAM 113). However, the printing apparatus 101 may have any configuration other than the above-described configuration. For example, the processes in the flowcharts to be described below can also be executed by causing a plurality of processors, memories, and storages to operate in cooperation. Some of the processes may be executed using a hardware circuit.

A printer interface (I/F) 119 connects a printer 120 (printer engine) and the control unit 110. The printer 120 prints an image on a sheet fed from a sheet feeding cassette (not illustrated) based on print data input via the printer I/F 119. As a printing method, an electrophotographic method for transferring toner onto a sheet and fixing the toner onto the sheet, or an inkjet method for discharging ink onto a sheet to execute printing may be used.

A scanner I/F 117 connects a scanner 118 and the control unit 110. The scanner 118 scans a document placed on a platen glass (not illustrated) and generates image data. The image data generated by the scanner 118 is printed by the printer 120, is stored in the storage 114, or is transmitted to an external apparatus via a network I/F 121.

An operation unit I/F 115 connects an operation unit 116 and the control unit 110. The operation unit 116 is provided with a liquid crystal display unit including a touch panel function and various hardware keys. The operation unit 116 functions as a display unit that displays information for the user, and also functions as a reception unit that receives an instruction from the user. The CPU 111 operates in cooperation with the operation unit 116 to perform information display control processing and control processing for receiving a user operation.

The network I/F 121 is connected to a network cable and thus can execute communication with an external apparatus on the network 100 or the Internet. The present exemplary embodiment assumes a case where the network OF 121 is a communication interface for establishing a wired communication conforming to Ethernet®. However, the present exemplary embodiment is not limited to this case. For example, the network OF 121 may be a wireless communication interface conforming to IEEE 802.11 series. Alternatively the network OF 121 may be a communication interface for establishing both of a wired communication and a wireless communication. Further, a communication interface for establishing a mobile communication, including a 3G line such as Code Division Multiple Access (CDMA), a 4G line such as LTE, and 5G New Radio (NR), may also be used.

Hardware Configuration of Server Resource for Providing CPS 102

Figure 6:
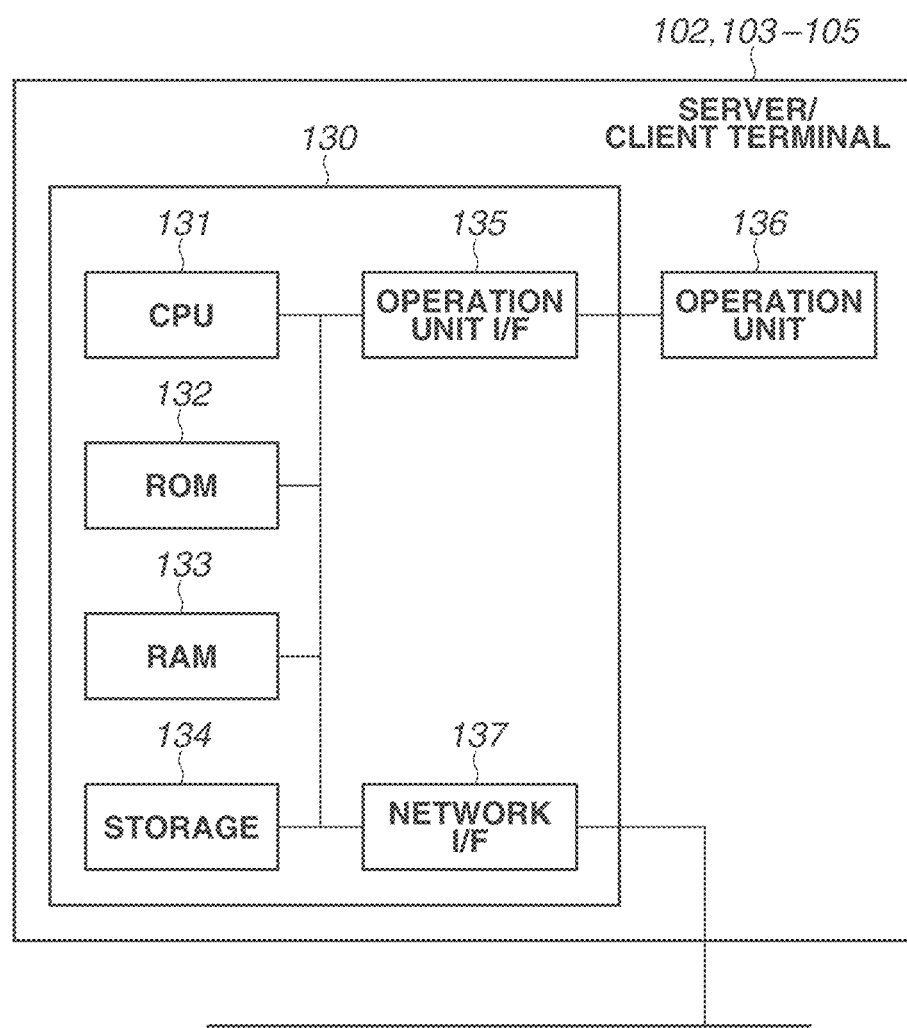
FIG. 6 is a block diagram illustrating an example of a hardware configuration of each of a server and client terminals.

FIG. 6 is a block diagram illustrating a hardware configuration of a server as a real resource for providing the CPS 102 illustrated in FIG. 1. The server that provides the CPS 102 is hereinafter also referred to as the server 102. A CPU 131 operates in cooperation with each unit to control the operation of the server 102. The CPU 131 reads out an OS and control programs stored in a ROM 132 or a storage 134, and executes the OS and control programs. The ROM 132 stores control programs that can be executed by the CPU 131. A RAM 133 is a main storage memory for the CPU 131, and is used as a work area or a temporary storage area for loading various control programs. The storage 134 stores print data, image data, various programs, and various setting information. The present exemplary embodiment assumes a case where an auxiliary storage device, such as a hard disk drive (HDD), is used as the storage 134. However, a nonvolatile memory, such as a solid state drive (SSD), may be used instead of the HDD. Thus, the hardware modules, such as the CPU 131, the ROM 132, and the RAM 133, constitute a computer. The server 102 may further include an application specific integrated circuit (ASIC) for rendering print data. The present exemplary embodiment illustrates a case where the processes in the flowcharts to be described below are executed in such a manner that a single CPU 131 uses a single memory (RAM 133), for ease of explanation. However, the present exemplary embodiment may have any configuration other than the above-described configuration. For example, the processes in the flowcharts to be described below can also be executed by causing a plurality of processors, RAMs, ROMs, and storages to operate in cooperation. The processes can also be executed using a plurality of server computers. The server 102 can provide a plurality of different tenants with the CPS by using a containerization or virtualization technique.

A network I/F (interface) 137 is an interface for communicating with an external apparatus via a network. The server 102 is connected to the Internet via the network I/F 137. An operation unit I/F 135 is an interface for connecting an operation unit 136 such as a keyboard, a mouse, and a display. Input/output devices connected to the operation unit I/F 135 are used for, for example, maintenance of the real server for providing the CPS.

The hardware configuration of each of the client terminals 103 to 105 is similar to that of the server 102.

The CPS 102 provided by the resource of the server 102 includes a function of registering and managing an output destination printer, a function of managing the progress of each print job, and a function of spooling print jobs. The CPS 102 stores output destination printer information for managing the output destination printer. The output destination printer information is management information in which attribute information indicating the capabilities of the printing apparatus, information used for communication with the printer (e.g., an internet protocol (IP) address, a printer host name, and an access token required for communication), and information for identifying the model name of the printing apparatus are associated. The management information is referred to, as needed, in the flowcharts to be described below.

Further, Windows®, Android®, macOS®, iOS®, or the like is installed in each of the client terminals 103 to 105. The user can use the print client and the print framework for the CPS 102 that are preliminarily installed in the OS. The print client and the print framework provide the user with a status monitor function for monitoring the progress of printer search processing, registration processing, print setting screen display processing, print data generation processing, processing for communication with the CPS 102, and printing. The present exemplary embodiment illustrates a case where the print client is preliminarily installed. However, the present exemplary embodiment is not limited to this case. For example, the print client may be subsequently installed by the user.

Printer Registration and Printing Sequences in First Exemplary Embodiment

Figure 7:
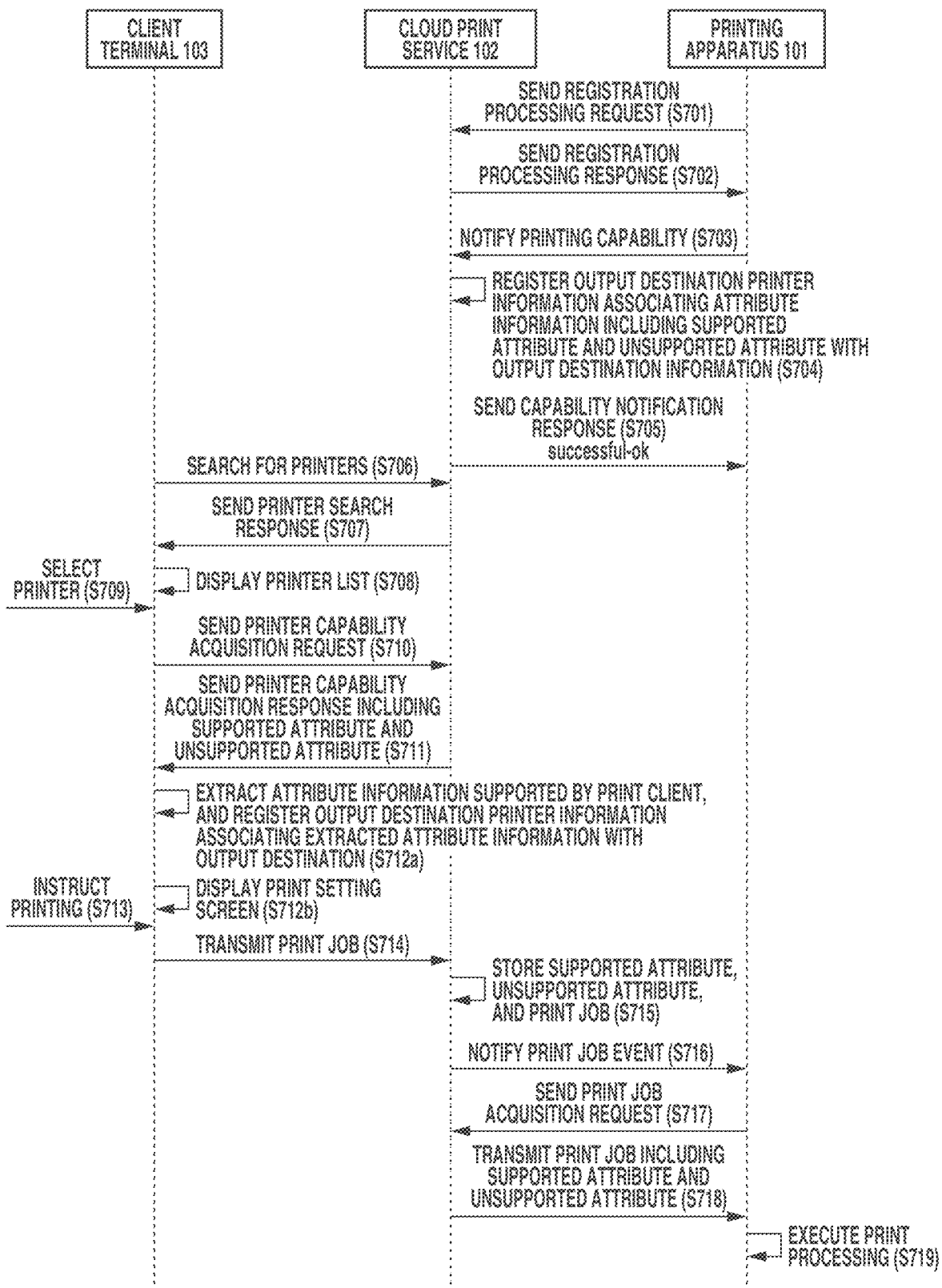
FIG. 7 is a sequence diagram illustrating an example of each of printer registration processing and print processing.

Next, the printer registration on the CPS 102 and printing processing according to the first exemplary embodiment will be described with reference to FIG. 7 and FIGS. 14A to 14C. FIG. 7 is a sequence diagram illustrating an example of a processing sequence. FIGS. 14A to 14C illustrate examples of exchange of capability information.

Steps S701 and S702 are registration processing similar to that of steps S201 and S202 illustrated in FIG. 2. The user, such as the administrator, selects a registration destination CPS via the operation unit 116 of the printing apparatus 101, and selects a "registration" button. The printing apparatus 101 that has detected the selection starts a registration operation. In step S701, the printing apparatus 101 that has detected the selection transmits a registration processing request to the CPS 102. A protocol for registration processing conforms to the protocol defined in the CPS. The present exemplary embodiment is described assuming that, for example, Register-Output-Device operation defined in Printer Working Group (PWG) 5100.22 is used. The CPS 102 that has received the registration processing request checks the content of the registration request. In step S702, the CPS 102 transmits a registration processing request response to the printing apparatus 101. If the content of the registration processing request is normal, a successful response is sent. If the content of the registration processing request is not normal, an unsuccessful response is sent. The present exemplary embodiment is described assuming that the successful response is sent. In the processing of steps S701 and S702, output destination printer information is registered on the CPS 102. Further, in the registration processing, an access token for accessing the CPS 102 from the printing apparatus 101 is issued. The printing apparatus 101 stores the access token in the storage 114 and uses the access token, for example, when the printing apparatus 101 sends an inquiry to the CPS 102 or makes a request.

Next, in step S703, the printing apparatus 101 transmits a capability notification including capability information supported by the printing apparatus 101 to the CPS 102. The present exemplary embodiment assumes a case where, for example, Update-Output-Device-Attributes operation defined in PWG 5100.18 is used. In the processing of step S703, for example, a packet indicating capability information illustrated in FIG. 14A is transmitted. The packet illustrated in FIG. 14A includes a list of character strings of attribute information illustrated in FIG. 4. In other words, the packet illustrated in FIG. 14A includes standard attribute information conforming to the IPP and vendor unique attribute information.

Next, in step S704, the CPS 102 that has received the capability information from the printing apparatus 101 registers not only the attribute information supported by the CPS 102 but also unsupported attribute information as output destination printer information. The supported attribute information and the unsupported attribute information are stored in such a manner that the supported attribute information and the unsupported attribute information can be distinguished from each other.

Then, in step S705, the CPS 102 transmits "Success-ok", which is a registration successful response illustrated in FIG. 14C to the printing apparatus 101. A status message is added to the information as additional information. The status message includes information indicating that some attributes are not supported by the CPS, or that an unsupported attribute is registered. This processing enables the printing apparatus registration processing using specification information that also includes information other than the attributes supported by the CPS and enables storage of the original specification information about the printing apparatus.

Next, a sequence for executing printing via the CPS from the client terminal (e.g., the client terminal 103) will be described with reference to steps S706 to S712. First, the user executes printer search processing on the CPS 102 from the operation unit of the client terminal 103. In step S706, the client terminal 103 that has detected a print search instruction from the user transmits a printer search request to the CPS 102. The search request includes cloud account information corresponding to the user who has logged in to the client terminal 103. The cloud account information is used to identify the tenant to which the user belongs. The printer search processing may be performed by a method of searching for printers by designating all printers, which are registered on the CPS 102 and managed by the tenant to which the user belongs, or by a method of searching for printers using filter conditions such as a specific printer name or location.

In step S707, the CPS 102 that has received the search request from the client terminal 103 transmits printer information that indicates the printer registered on the CPS 102 and matches the search request to the client terminal 103. At this time, there is no need to send a response including specification information associated with the printer, and it only needs to send a response including only representative attribute information, such as the printer name, which is required for selecting the output destination. In step S708, the client terminal 103 that has received the printer list information from the CPS 102 displays a list of the printers on the operation unit. The client terminal 103 may search for printers on a local network by using a search protocol, such as a multicast Domain Name System (mDNS) protocol, and may merge the search results and display the search results on a printer list screen. It is assumed that the output destination printers registered on the print framework of the client terminal 103 are also displayed in a list on the screen. In step S709, the user selects a desired printer from the printer list. The present exemplary embodiment illustrates an example where the printer that is registered on the CPS 102 but is not registered in the client terminal 103 is selected.

In step S710, the client terminal 103 that has detected that the printer is selected transmits a printer capability acquisition request to the CPS 102 so as to acquire the detailed specification of the printer. The present exemplary embodiment assumes a case where the printer capability acquisition request is made by, for example, Get-Printer-Attributes operation defined in the IPP. In step S711, the CPS 102 that has received the printer capability acquisition request transmits a printer capability response including the attribute information supported by the CPS 102 and unsupported attribute information to the client terminal 103. In the processing of step S711, for example, a packet indicating capability information illustrated in FIG. 14B is transmitted. The packet illustrated in FIG. 14B includes a list of character strings of attribute information registered on the CPS 102 in step S704. The attribute information including attributes that are not supported by the CPS 102 but are supported by the printing apparatus 101 as illustrated in FIG. 14B can be notified. Then, in step S712a, the client terminal 103 extracts attribute information supported by the print client in the terminal, and registers output destination printer information by associating the extracted attribute information with the output destination. In the processing of step S712a, the unsupported attribute information that is not supported by the print client is discarded.

Figure 8:
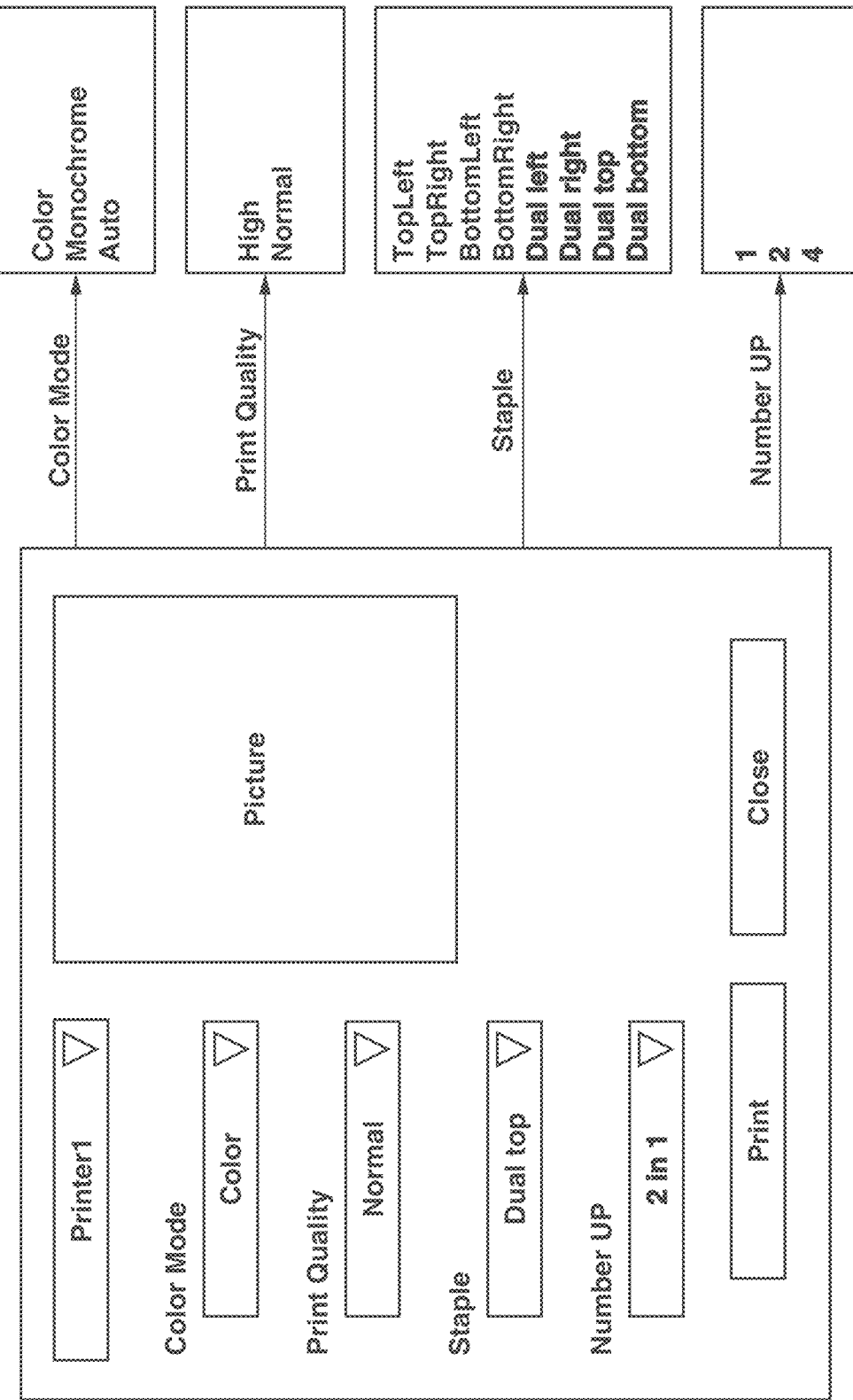
FIG. 8 illustrates an example of a print setting screen to be displayed on an operation unit of a client terminal.

Next, step S712b, the client terminal 103 displays a print setting screen based on the output destination printer information registered in step S712a. FIG. 8 illustrates an example of the print setting screen to be displayed in step S712b. As described above with reference to FIG. 4, the print client of the client terminal 103 supports the attribute values for "number-up" printing and stapling output materials at two positions, and thus these setting values can be appropriately displayed. In FIG. 8, portions in bold letters indicate print settings that cannot be displayed in the print setting screen of the related art described above with reference to FIG. 2. Accordingly, a printing user interface (UI) can be appropriately displayed even when the print client of the client terminal is upgraded and the print client supports new functions. This therefore increases the possibility that the user can make desired print settings.

Next, a sequence to be performed when printing is executed will be described with reference to steps S713 to S719. In step S713, the user changes the print settings via the screen illustrated in FIG. 8 as needed, and presses a print button. In step S714, the client terminal 103 that has detected that the print button is pressed transmits a print request including attribute information indicated by the print settings to the CPS 102. The present exemplary embodiment assumes a case where the print request is made by Create-Job operation or Print-Job operation defined in the IPP. When the instruction is made by Print-Job operation, the attribute information and print data are transmitted. When the instruction is made by Create-Job operation, a plurality of pieces of document data is registered as a printing target by using an operation for adding a subsequent printing target document.

Next, in step S715, the CPS 102 analyzes the print execution request received from the client terminal 103 and stores print attributes (information indicating print settings) included in the request and information about the print job associated with document data to be printed in the storage of the CPS 102.

Also, in this case, even if an unsupported attribute value is included in the request, the CPS 102 stores the unsupported attribute in a similar manner to the supported attributes. During the storage, processing, such as rendering of print data, may be performed on the CPS 102.

Next, in step S716, the CPS 102 sends a notification that the print job is input to the printing apparatus 101. For the notification, for example, Get-Notification operation defined in the IPP can be used.

In step S717, the printing apparatus 101 that has detected that the print job is present in the CPS 102 sends a print job acquisition request to the CPS 102. For the print job acquisition request, for example, Fetch-Job operation defined in the IPP can be used. In step S718, the CPS 102 that has received the print job acquisition request sends the print data and print attribute values stored in the storage as a response. In the present exemplary embodiment, the unsupported attribute information is not discarded but is stored in step S715. Thus, the attribute information that is not supported by the CPS 102 can also be appropriately transmitted to the printing apparatus 101. In step S719, the printing apparatus 101 prints an image on a sheet based on the received print job.

For example, in a case where the print setting "2-in-1" is made on the screen of FIG. 8 that is displayed on the client terminal 103, the attribute information corresponding to the setting "2-in-1" is not discarded by the CPS 102 but is transmitted to the printing apparatus 101. Accordingly, the printing apparatus 101 can determine that N-up printing is to be performed based on the attribute information, and thus can appropriately perform N-up printing.

Figure 9:
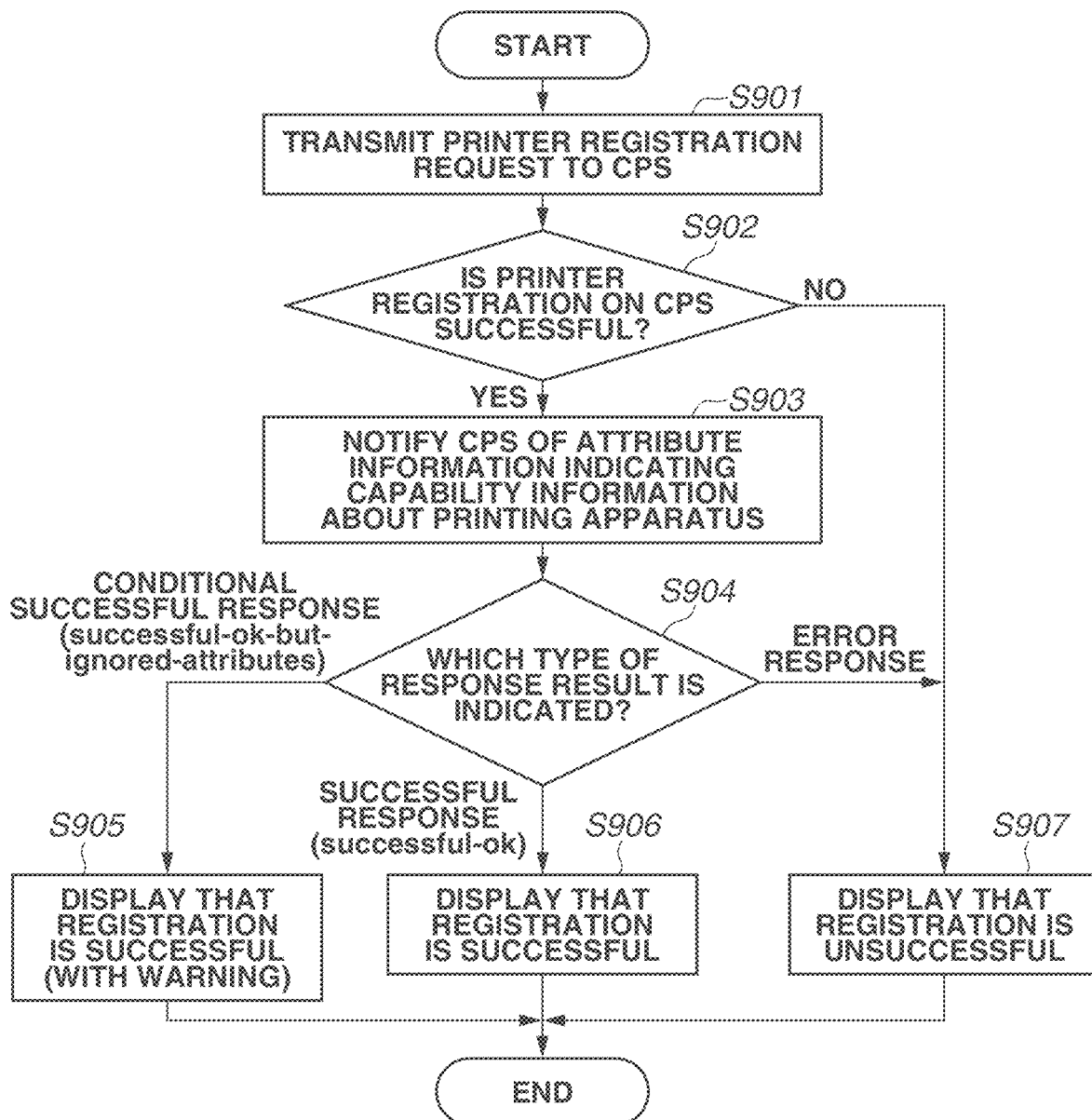
FIG. 9 is a flowchart illustrating an example of registration control processing to be executed by the printing apparatus.
Figure 10:
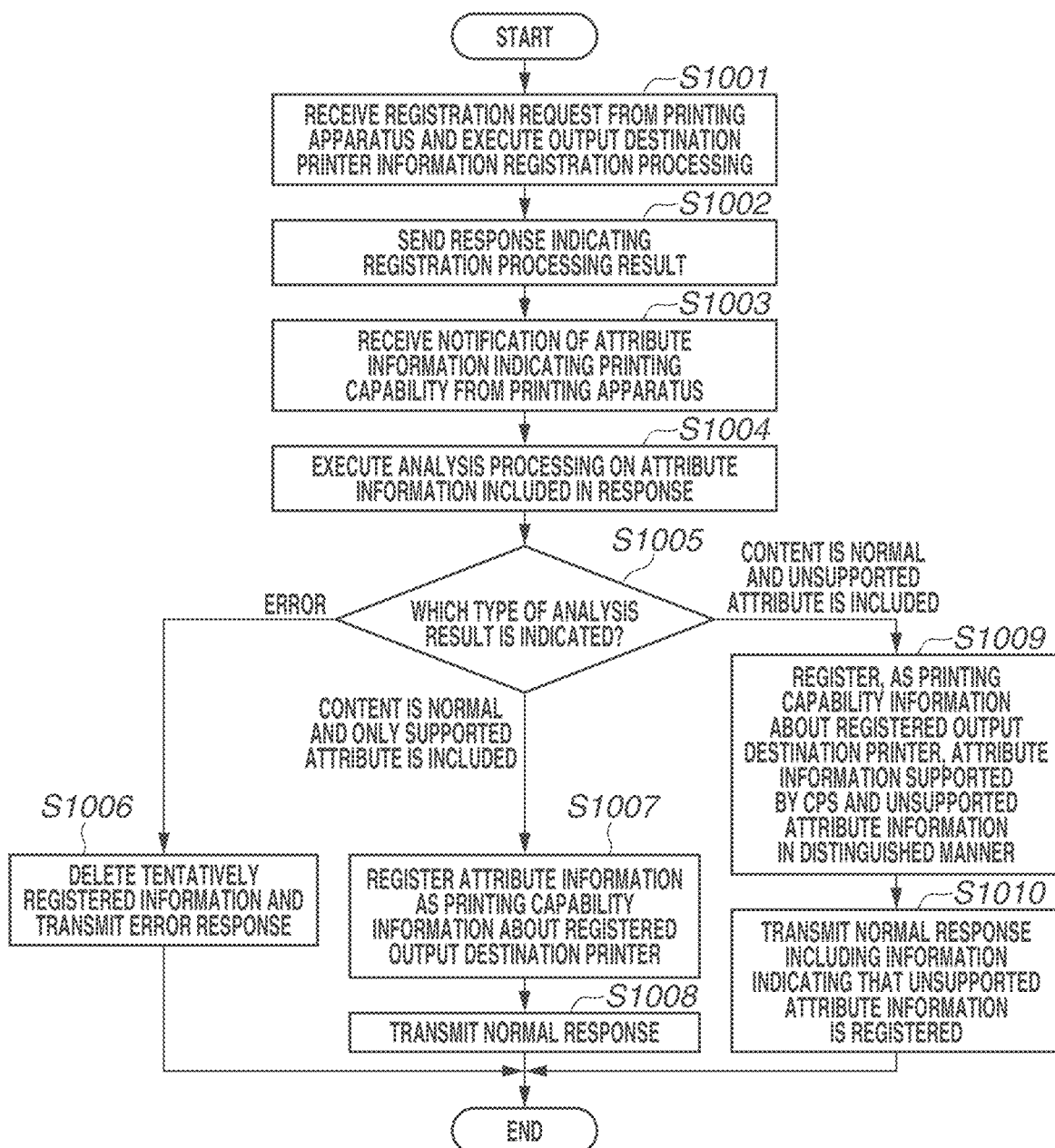
FIG. 10 is a flowchart illustrating an example of registration control processing to be executed by a CPS.
Figure 11:
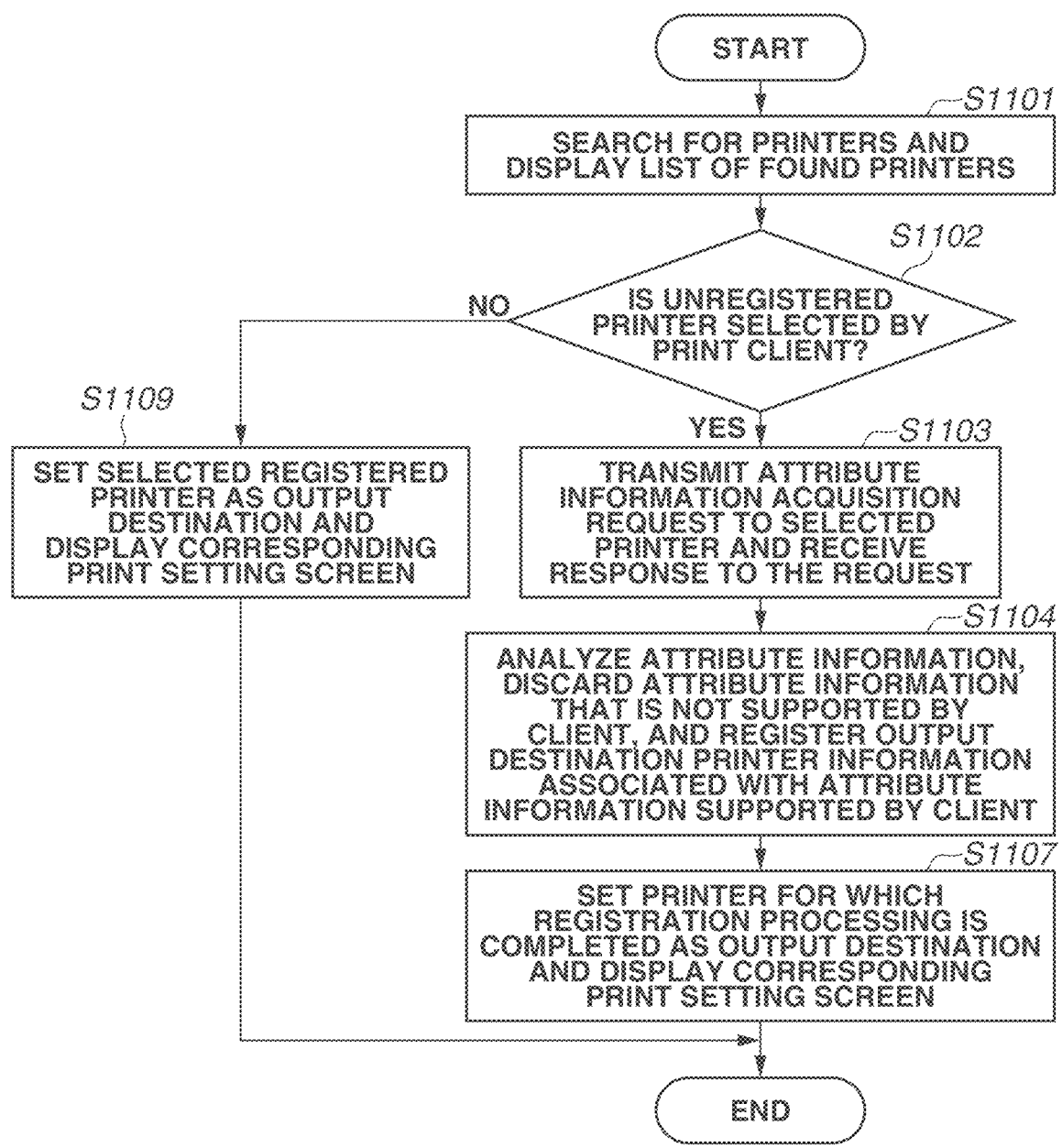
FIG. 11 is a flowchart illustrating an example of control processing to be executed by the client terminal.
Figure 12:
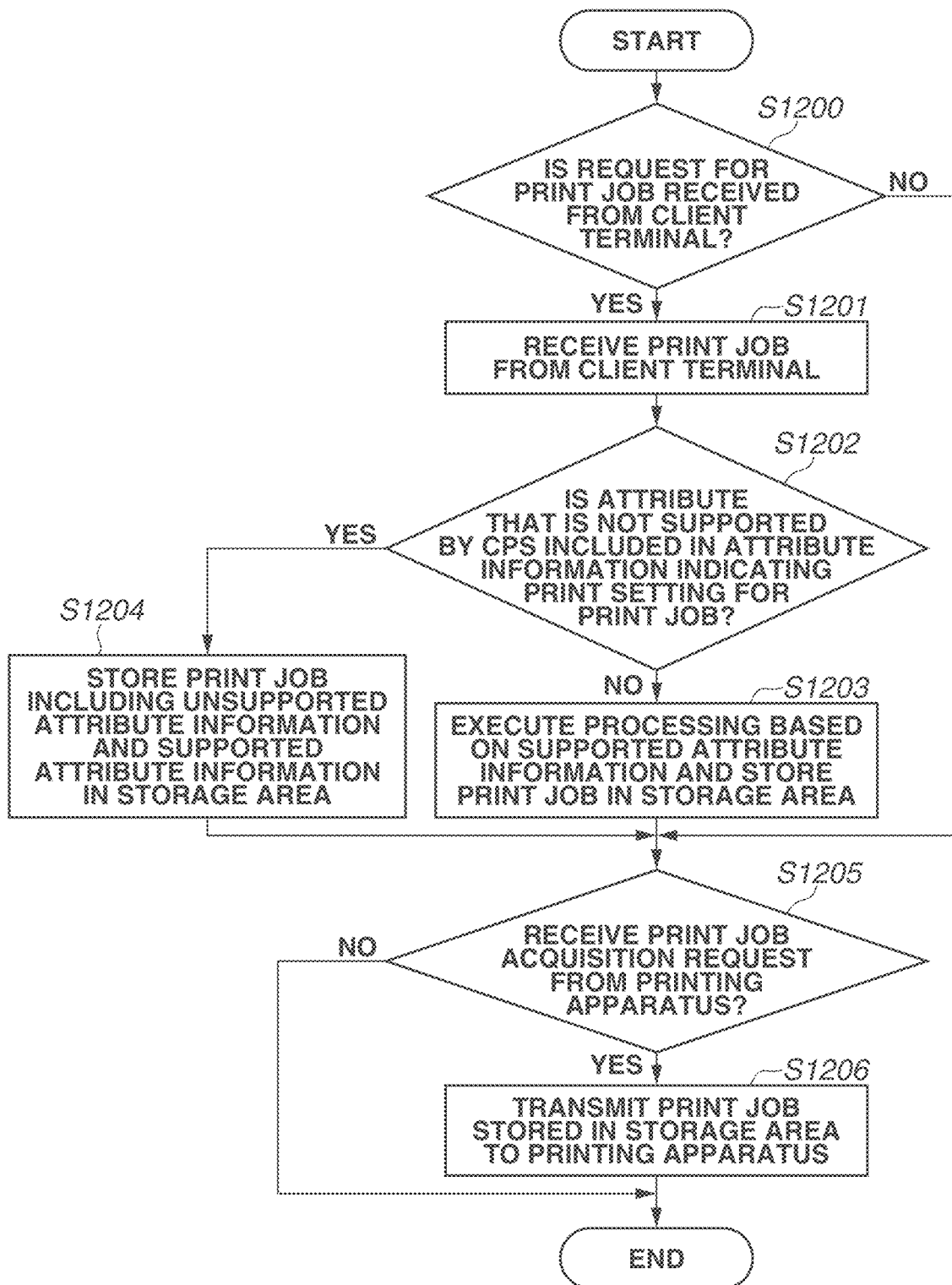
FIG. 12 is a flowchart illustrating an example of print job reception/transfer control processing to be executed by the CPS.
Figure 13:
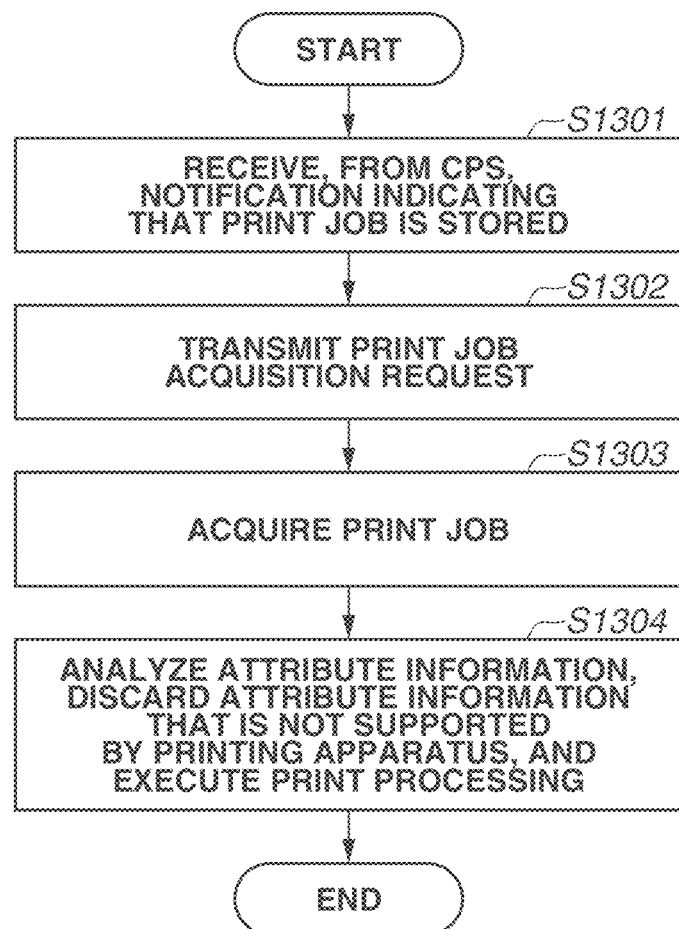
FIG. 13 is a flowchart illustrating an example of print control processing to be executed by the printing apparatus.

Control processing in each device constituting the printing system will be described with reference to flowcharts illustrated in FIGS. 9 to 13. FIGS. 9 and 13 illustrate processing in the printing apparatus 101. FIGS. 10 and 12 illustrate processing in the CPS 102. FIG. 11 illustrates processing in the client terminal.

Each operation (step) in the flowchart illustrated in FIG. 9 is implemented by the CPU 111 executing control programs stored in the ROM 112 or the storage 114. The processing illustrated in FIG. 9 is executed when a registration request for registering a printer on the CPS 102 is received from the administrator.

In step S901, the CPU 111 transmits the registration request to the CPS 102. In step S902, the CPU 111 determines whether the printer registration on the CPS 102 is successful. Specifically, if the registration result received from the CPS 102 indicates "successful", it is determined that the registration is successful (YES in step S902). Then, the processing proceeds to step S903. On the other hand, if the registration result received from the CPS 102 indicates "unsuccessful", or if no response is received after a lapse of a predetermined period, it is determined that the registration is unsuccessful (NO in step S902). Then, the processing proceeds to step S907.

In step S903, the CPU 111 transmits the capability notification illustrated in FIG. 14A to the CPS 102. In step S904, the CPU 111 determines the type of the response to the capability notification transmitted in step S903. For example, when the response indicates a format error, an authentication error, or the like, the CPU 111 determines the type of the response to be an error response (ERROR RESPONSE in step S904). Then, the processing proceeds to step S907. On the other hand, when the response is a successful response, such as "Success-ok" as illustrated in FIG. 14C, the CPU 111 determines the type of the response to be a successful response (SUCCESSFUL RESPONSE in step S904). Then, the processing proceeds to step S906. When the response is a response indicating that the registration is successful but some of attributes are discarded, such as "Successful-ok-but-ignored-Attributes", the CPU 111 determines the type of the response to be a conditional successful response (CONDITIONAL SUCCESSFUL RESPONSE in step S904). Then, the processing proceeds to step S905.

In step S905, the CPU 111 displays the registration result indicating that the registration is successful but some of the attributes are ignored on the operation unit 116. In step S906, the CPU 111 displays the registration result indicating that the registration is successful on the operation unit 116. In step S907, the CPU 111 displays the registration result indicating that the registration is unsuccessful on the operation unit 116.

Next, output destination printer registration processing on the CPS that is executed by the server 102 that provides the CPS 102 will be described with reference to FIG. 10. Each operation (step) in the flowchart illustrated in FIG. 10 is implemented by the CPU 131 included in the server 102 when the CPU 131 executes control programs stored in the ROM 132 or the storage 134. As described above with reference to FIG. 6, the processing can also be executed by causing a plurality of computer resources to operate in cooperation. Further, communication processing are implemented by an operation in cooperation with the network OF 137.

In step S1001, the CPU 131 of the server 102 receives a registration request from the printing apparatus 101, and executes registration processing for registering the output destination printer on the CPS 102. The CPU 131 creates output destination printer information for managing the cloud printer on the CPS 102. Further, an access token for accessing the CPS 102 from the printing apparatus 101 is issued. After completion of the registration processing, the processing proceeds to step S1002. In step S1002, the CPU 131 sends the registration processing result as a response to the printing apparatus 101. In a case where the registration processing is unsuccessfully completed, for example, when the user authentication is unsuccessful, or when the request content is not normal, a notification indicating an error is sent. When the error notification is sent, the CPU 131 interrupts the registration processing without performing subsequent capability update processing.

Next, in step S1003, the CPU 131 receives the capability notification illustrated in FIG. 14A from the printing apparatus 101 that has been successfully registered in step S1002. In step S1004, the CPU 131 performs analysis processing on the attribute information included in the capability notification received in step S1003. Specifically, the CPU 131 checks if the received content satisfies a prescribed format, or if the received content includes data used for an injection attack or the like. If the received content does not satisfy the format, or if the received content includes data to be used for an injection attack or the like, it is determined that the content is not appropriate, and information indicating an error is recorded as the analysis result. On the other hand, if the content is normal, information indicating that the content is normal is recorded as the analysis result. Further, the CPU 131 performs processing for classifying the attribute information into attribute information that is supported by the CPS 102 and attribute information that is not supported by the CPS 102. When at least one piece of attribute information that is not supported by the CPS 102 is included, the CPU 131 records the analysis result indicating that the unsupported attribute is included. On the other hand, when the attribute information that is not supported by the CPS 102 is not included, the CPU 131 records the analysis result indicating that only the supported attribute information is included.

In step S1005, the CPU 131 determines the type of the result of the analysis processing executed in step S1004. If the analysis result indicates an error (ERROR in step S1005), the processing proceeds to step S1006. If the analysis result indicates that the content is normal and only the supported attribute is included (CONTENT IS NORMAL AND ONLY SUPPORTED ATTRIBUTE IS INCLUDED in step S1005), the processing proceeds to step S1007. On the other hand, if the analysis result indicates that the content is normal and the unsupported attribute is included (CONTENT IS NORMAL AND UNSUPPORTED ATTRIBUTE IS INCLUDED in step S1005), the processing proceeds to step S1009.

In step S1006, the CPU 131 deletes the output destination printer information registered in step S1001, transmits an error response to the printing apparatus 101, and terminates the series of registration processing.

In step S1007, the CPU 131 updates information indicating the printing capabilities included in the output destination printer information registered in step S1001 with the attribute information acquired in step S1003. In other words, the printing capabilities of the printing apparatus 101 are registered in the output destination printer information. Next, in step S1008, the CPU 131 transmits a normal response to the printing apparatus 101.

In step S1009, the CPU 131 updates the information indicating the printing capabilities included in the output destination printer information registered in step S1001 with the attribute information classified in step S1005. Specifically, the attribute information that is supported by the CPS 102 and the attribute information that is not supported by the CPS 102 are registered in the output destination printer information in such a manner that the supported attribute information and the unsupported attribute information can be identified. Then, in step S1010, the CPU 131 transmits, to the printing apparatus 101, the normal response indicating information indicating that the unsupported attribute information is registered as described above with reference to FIG. 14C. After completion of the response, the series of registration processing is terminated.

The processing described above with reference to FIG. 10 makes it possible to register the capability information corresponding to the full specification of the printing apparatus described above with reference to FIG. 4 on the CPS 102.

Next, control processing to be performed when the printer registered on the CPS 102 is used from the client terminal will be described with reference to FIG. 11.

Each operation (step) in the flowchart illustrated in FIG. 11 is implemented by the CPU 131 of the client terminal (e.g., the client terminal 103) when the CPU 131 executes control programs stored in the ROM 132 or the storage 134. The flowchart illustrated in FIG. 11 is executed when an operation for searching for printers is received from the user.

In step S1101, the CPU 131 of the client terminal 103 searches for printers and displays a list of found printers.

Next, in step S1102, the CPU 131 of the client terminal 103 determines whether a user operation for selecting a printer that is not registered in the print client has been received. If the user operation for selecting a printer that is not registered in the print client has been received (YES in step S1102), the processing proceeds to step S1103. If the user operation for selecting a printer that is registered in the print client has been received (NO in step S1102), the processing proceeds to step S1109. In step S1109, the CPU 131 of the client terminal 103 sets the selected registered printer as the output destination. Next, the CPU 131 refers to the output destination printer information corresponding to the selected printer, and acquires attribute information. Then, the CPU 131 generates a print setting screen based on the acquired attribute information. After the generation of the print setting screen is completed, the CPU 131 displays the generated print setting screen on the operation unit 136, and terminates a series of processing. After completion of the series of processing, print setting change processing and print job transmission processing, which are described above with reference to FIG. 7, are performed.

In step S1103, the CPU 131 of the client terminal 103 transmits an attribute information acquisition request to the selected printer, and receives a response to the request. Next, in step S1104, the CPU 131 analyzes the attribute information, discards the attribute information that is not supported by the client, and extracts only the attribute information that is supported by the client. Then, the output destination printer information, in which the extracted attribute information supported by the client is associated with information for identifying the output destination (e.g., an IP address, a host name, and the like of the CPS 102), is registered on the print framework provided by the OS. For example, when Windows® is used as the OS, the registration of output destination printer information indicates processing for generating a print queue for transmitting data to the CPS 102 and configuring a printer driver based on the acquired capability information.

Next, in step S1107, the CPU 131 of the client terminal 103 sets the printer for which the registration processing is completed as the output destination. Then, the CPU 131 acquires attribute information corresponding to the printer set as the output destination and generates a print setting screen. After the generation of the print setting screen is completed, the CPU 131 displays the generated print setting screen on the operation unit 136, and then terminates the series of processing. After completion of the series of processing, the print setting change processing and print job transmission processing described above with reference to FIGS. 7 and 8 are performed.

The processing described above makes it possible to appropriately display a print UI even when the print client of the client terminal is upgraded and supports new functions.

Next, control processing to be performed when the CPS 102 receives a print job from the client terminal will be described with reference to the flowchart illustrated in FIG. 12. Each operation (step) in the flowchart illustrated in FIG. 12 is implemented by the CPU 131 included in the server 102 when the CPU 131 executes control programs stored in the ROM 132 or the storage 134, like in FIG. 10.

In step S1200, the CPU 131 of the server 102 determines whether a request for the print job has been received from the client terminal. If the request for the print job has been received from the client terminal (YES in step S1200), the processing proceeds to step S1201. If the request for the print job has not been received from the client terminal (NO in step S1200), the processing proceeds to step S1205. The present exemplary embodiment assumes a case where the request for the print job is made by Create-Job operation or Print-Job operation defined in the IPP. However, the present exemplary embodiment is not limited to this case. For example, Validate-Job operation by which a communication partner makes an inquiry about whether a print job can be processed before the client transmits the print job may be used.

In step S1201, the CPU 131 of the server 102 receives a series of print jobs including print data to be transmitted after the print request is received from the client terminal. Next, in step S1202, the CPU 131 determines whether the attribute information indicating print settings for the print jobs includes attribute information that is not supported by the CPS 102. If the attribute information does not include attribute information that is not supported by the CPS 102 (NO in step S1202), the processing proceeds to step S1203. If the attribute information includes attribute information that is not supported by the CPS 102 (YES in step S1202), the processing proceeds to step S1204. When the print request received in step S1200 is made by Create-Job operation or Validate-Job operation, only the attribute information is sent to the CPS 102 before print data (document data) is received. Accordingly, the determination in step S1202 may be made before print data (document data) is received, and then the print data may be received.

In step S1203, if the server is to perform rendering processing or data conversion processing based on the supported attribute information, the CPU 131 executes rendering processing or data conversion processing. Further, if conversion processing is to be performed on print data, the converted print data and the print jobs including attribute information are stored in the storage area. If there is no need to perform conversion processing, the received print data and the print jobs including the attribute information are stored in the storage area.

On the other hand, in step S1204, the CPU 131 stores the print jobs including unsupported attribute information, supported attribute information, and print data in the storage area. The processing of step S1204 differs from the processing of step S1203 in that rendering processing or data conversion processing is not performed in consideration of the dependence relation between the unsupported attribute information and the supported attribute information.

Rendering processing or data conversion processing may not be performed on the CPS 102. In this case, processing of simply storing the received print jobs may be performed instead of the processing of steps S1202 to S1204.

Next, in step S1205, the CPU 131 determines whether the print job acquisition request has been received from the printing apparatus (e.g., the printing apparatus 101). If it is determined that the print job acquisition request has been received (YES in step S1205), the processing proceeds to step S1206. If the print job acquisition request has not been received (NO in step S1205), the series of processing is terminated.

In step S1206, the CPU 131 transmits the print job corresponding to the acquisition request to the printing apparatus that has sent the request. After the transmission is completed, the series of processing is terminated. The reception processing and transmission processing illustrated in FIG. 12 may be repeatedly performed during a period in which the CPS 102 provides the print service.

Next, control processing to be performed when the printing apparatus 101 receives a print job from the CPS 102 and executes printing will be described with reference to the flowchart illustrated in FIG. 13. Each operation (step) in the flowchart illustrated in FIG. 13 is implemented by the CPU 111 executing control programs stored in the ROM 112 or the storage 114, like in FIG. 9.

In step S1301, the CPU 111 receives a notification indicating that a print job to be executed is stored from the CPS 102. Then, in step S1302, the CPU 111 transmits a print job acquisition request. Specifically, the printing apparatus 101 sends an inquiry about a list of available jobs to the CPS 102. Then, the printing apparatus 101 transmits an acquisition request for acquiring data on each print job included in the list.

Next, in step S1303, the CPU 111 acquires the print job from the CPS 102. In step S1304, the CPU 111 analyzes the attribute information included in the acquired print job, discards the attribute information that is not supported by the printing apparatus, and executes print processing. The processing described above with reference to FIGS. 9 to 13 makes it possible to make the maximum use of the capabilities supported by the client terminal 103 in a case where printing is executed via the CPS 102. The present exemplary embodiment described above illustrates an example of the capability notification during registration of a printer for the first time. However, the present exemplary embodiment is not limited to this example. For example, the output destination printer information managed by the client terminal may be updated at predetermined intervals (e.g., every 30 days).

A second exemplary embodiment provides a mechanism for installing a print extension application provided by the vendor of the printing apparatus 101 in the client terminal 104, in addition to the processing according to the first exemplary embodiment. This print extension application extends the appearance of print settings and a user interface for print settings on the client terminal 104.

A hardware configuration of each device according to the second exemplary embodiment is similar to that of the first exemplary embodiment. Differences between the second exemplary embodiment and the first exemplary embodiment will be described below. The printing system according to the second exemplary embodiment includes not only the devices according to the first exemplary embodiment but also a server that distributes the print extension application. The present exemplary embodiment illustrates an example where the print extension application is installed in the client terminal 104.

Figure 15:
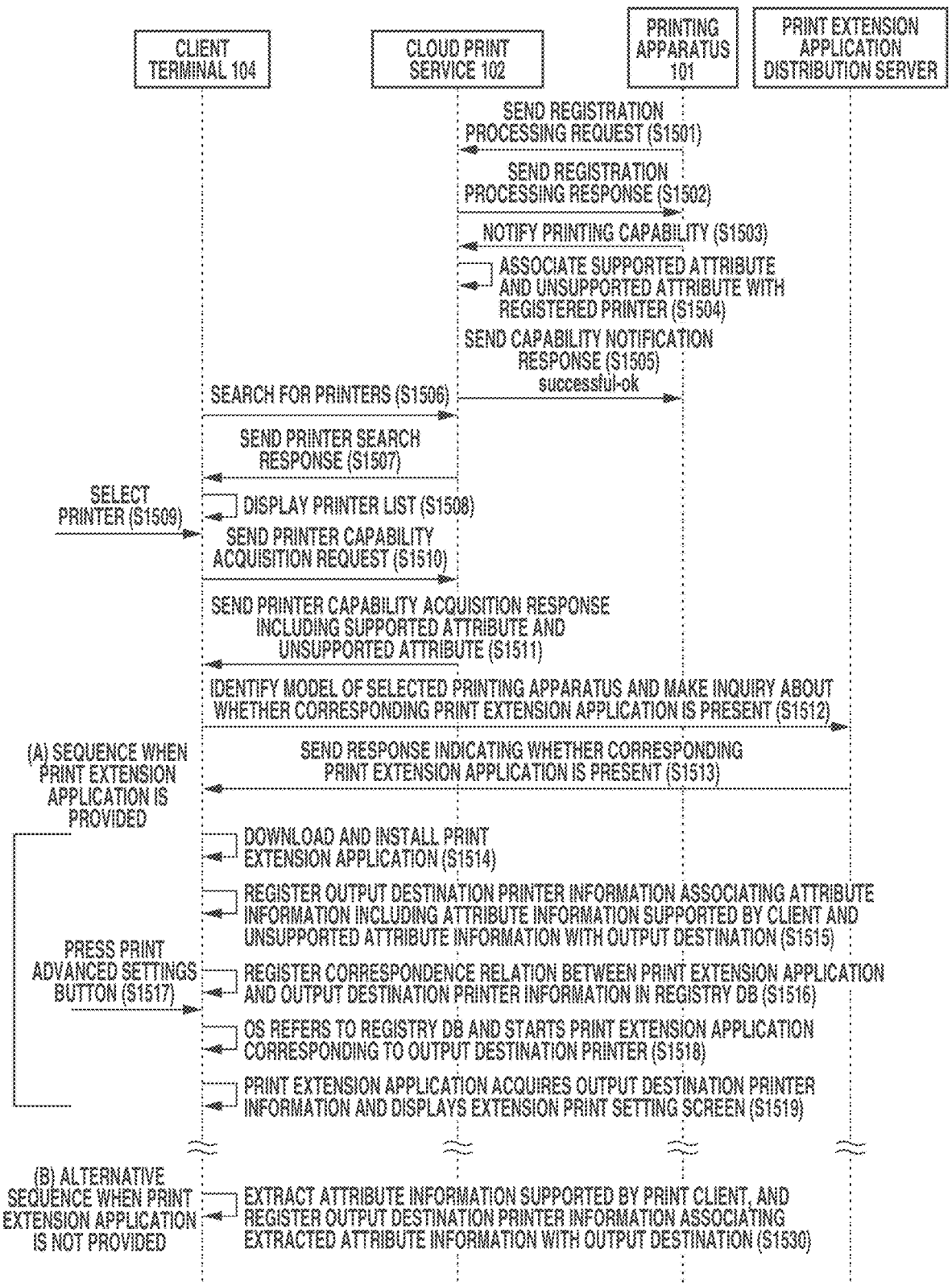
FIG. 15 is a sequence diagram illustrating an example of printer registration processing and print setting extension processing according to a second exemplary embodiment.

A distribution mechanism and a print extension application calling method will be described below with reference to a sequence diagram illustrated in FIG. 15. FIG. 15 is a sequence diagram illustrating processing according to the second exemplary embodiment to be executed in place of the sequence illustrated in FIG. 7 according to the first exemplary embodiment.

The printer registration processing on the CPS 102 and the printer selection processing and capability acquisition processing in the client terminal described in steps S1501 to S1511 are similar to steps S701 to S711 illustrated in FIG. 7, and thus the descriptions thereof are omitted.

In step S1512, the client terminal 104 identifies the model of the printing apparatus selected in step S1509. Next, information indicating the identified model (also referred to as model information) is transmitted to the distribution server, and an inquiry about whether the print extension application is present is made. In step S1513, the distribution server that has received the inquiry determines whether the print extension application for the model is present, and sends a response indicating whether the print extension application is present to the client terminal 104. If the print extension application is present, the distribution server includes information about an application downloading destination in the response.

A case where the print extension application is provided from the distribution server will now be described with reference to steps S1514 to S1518. In step S1514, the OS of the client terminal 104 downloads the print extension application from the distribution server based on the downloading destination information included in the response and installs the print extension application in the client terminal 104.

Next, in step S1515, the OS of the client terminal 104 registers output destination printer information in which the attribute information including attribute information supported by the client and attribute information that is not supported by the client is associated with information for identifying the output destination.

Next, in step S1516, the OS of the client terminal 104 registers the correspondence relation between the print extension application and the output destination printer information in a registry database (DB). The storage destination of the correspondence relation is merely an example. The correspondence relation may be stored in any storage area that can be referred to by the OS of the client terminal 104.

Then, in step S1517, the user presses an advanced print settings button through a print setting screen provided by the OS or an easy print setting screen provided by a general-purpose application. The OS of the client terminal 104 that has detected that the advanced settings button is pressed identifies information about the printer selected as the output destination when the advanced settings button is pressed. Next, in step S1518, the OS of the client terminal 104 refers to the registry DB based on the identified information, and identifies and starts the corresponding print extension application.

Figure 16:
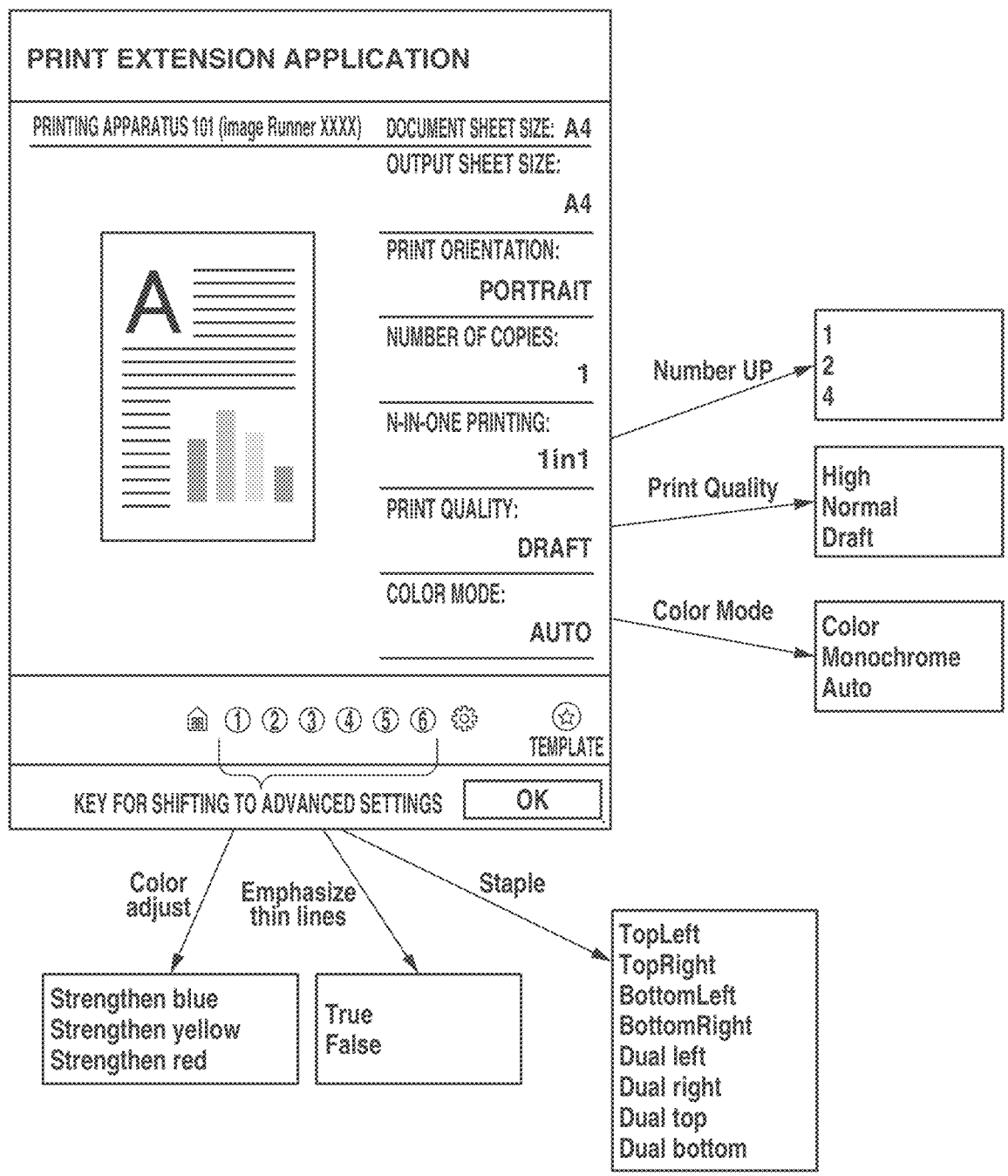
FIG. 16 illustrates an example of a print setting screen to be displayed by a print extension application according to the second exemplary embodiment.

In step S1519, the print extension application started by the OS acquires attribute information included in the associated output destination printer information, and displays an extension print setting screen based on the acquired attribute information. FIG. 16 illustrates an example of the extension print setting screen provided by the print extension application. For example, the print extension application is an application provided by the vendor that manufactures the printing apparatus 101 and is configured such that print settings dedicated to the printing apparatus 101 are available. FIG. 16 illustrates a main screen, and each of numbers 1 to 6 in circles represents a key for shifting to the advanced settings screen. The user can make post-processing setting, such as stapling, by selecting any one of the keys. It is also possible to make print settings corresponding to vendor unique attribute information, such as color adjustment and thin line emphasizing functions, which are not supported by the general-purpose print client in the first exemplary embodiment. Upon detecting that an OK button is selected, the print extension application updates the content of the attribute information based on the settings made via the screen, and then the application is terminated. FIGS. 17A and 17B are diagrams illustrating print attribute information according to the second exemplary embodiment. FIG. 17A illustrates a packet as an example of a request for a print job to be transmitted to the CPS 102. In this case, the packet indicates a case where thin line printing is valid and "strengthen blue" is selected as the color strengthening setting through a screen provided by the print extension application. The print client also transmits attribute information that is not supported by the print client to the CPS 102 without discarding the attribute information. The print job is temporarily stored in the CPS 102. The CPS 102 transmits the print job to the printing apparatus 101 when the job acquisition request is received from the printing apparatus 101. FIG. 17B illustrates attribute information about the print job transmitted from the CPS 102 to the printing apparatus 101. The CPS 102 does not discard attribute information that is not supported by the CPS 102, and directly transfers the attribute information to the printing apparatus 101. Accordingly, the printing apparatus 101 can appropriately interpret the attribute information received via the CPS 102 and executes printing.

Next, an alternative sequence to be executed when the corresponding print extension application is not provided will be described. In step S1530, the client terminal extracts attribute information supported by the print client from the attribute information acquired in step S1511. Then, the output destination printer information in which the extracted attribute information is associated with the output destination is registered, and then the series of processing is terminated.

Figure 18:
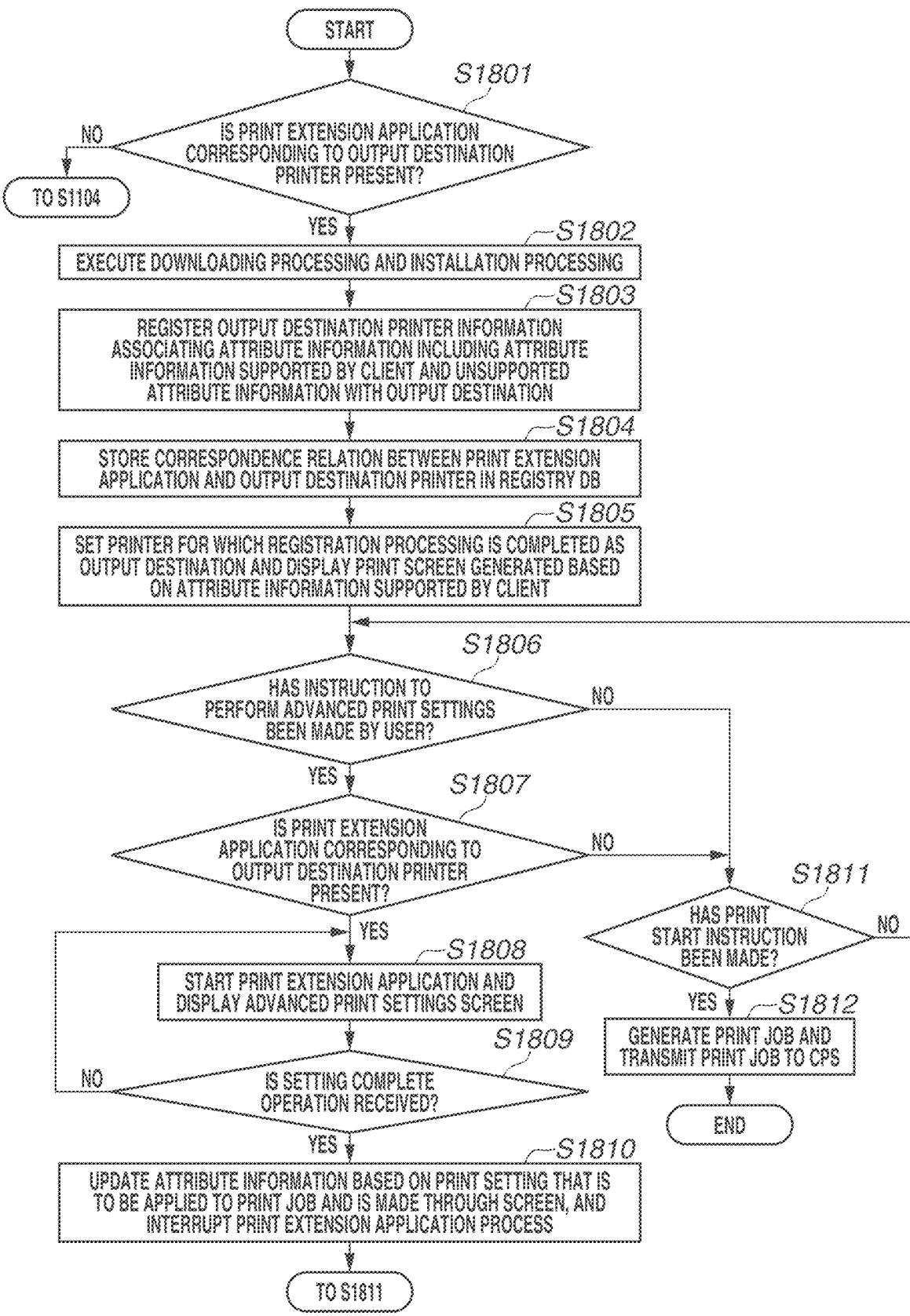
FIG. 18 is a flowchart illustrating an example of control processing to be executed by a client terminal according to the second exemplary embodiment.

Specific control processing in the client terminal will be described with reference to FIG. 18. Each operation (step) in the flowchart illustrated in FIG. 18 is implemented by the CPU 131 of the client terminal 104 when the CPU 131 executes control programs stored in the ROM 132 or the storage 134. If there is a need to clarify a main program that executes the processing, a control program (OS or extension application) to be executed by a processor is described as the subject.

The flowchart illustrated in FIG. 18 is executed when an operation for selecting a printer that is not registered in the client terminal 104 but is registered on the CPS 102 from among the printers found by printer search processing is received.

In step S1801, the OS of the client terminal 104 sends an inquiry about whether the print extension application corresponding to the output destination printer to be registered is present to the distribution server. As a result of the inquiry, if the corresponding print extension application is present (YES in step S1801), the processing proceeds to step S1802. If the print extension application is not present (NO in step S1801), the processing proceeds to step S1104. In step S1802, the OS of the client terminal 104 downloads the print extension application from the distribution server and installs the print extension application in the client terminal 104. After the installation is completed, the processing proceeds to step S1803.

In step S1803, the OS of the client terminal 104 registers, on the print framework, output destination printer information in which the attribute information including attribute information that is supported by the client and attribute information that is not supported by the client is associated with the output destination. Next, in step S1804, the OS of the client terminal 104 stores the correspondence relation between the print extension application and the output destination printer in the registry DB. For example, an application path for starting the print extension application and information for identifying the output destination printer are stored in association with each other.

In step S1805, the OS of the client terminal 104 sets the printer for which the registration processing is completed as the output destination, and displays the print setting screen generated based on the attribute information supported by the print client. In this case, the print settings corresponding to the attribute information that is not supported by the print client are not displayed.

In step S1806, the OS of the client terminal 104 determines whether a user instruction for making advanced print settings has been made on the print setting screen displayed in step S1805. If it is detected that the user instruction for making advanced print settings has been made (YES in step S1806), the processing proceeds to step S1807. If it is not detected that the user instruction for making advanced print settings has not been made (NO in step S1806), the processing proceeds to step S1811.

In step S1807, the OS of the client terminal 104 determines whether the print extension application corresponding to the output destination printer is present. Specifically, the OS acquires information for identifying the output destination printer, and determines whether the information for identifying the print extension application corresponding to the output destination printer is stored in the registry DB. If the information for identifying the print extension application corresponding to the output destination printer is stored (YES in step S1807), the processing proceeds to step S1808. On the other hand, if the information for identifying the print extension application corresponding to the output destination printer is not stored (NO in step S1807), the advanced settings screen is not displayed and the processing proceeds to step S1811.

In step S1808, the OS of the client terminal 104 starts the print extension application. The print extension application started by the OS acquires attribute information included in the output destination printer information, and displays the advanced print settings screen illustrated in FIG. 16 based on the attribute information. The user can change the print settings via the setting screen. The print extension application that has received a setting change operation updates the display of the setting screen and feeds the current setting state back to the user.

In step S1809, the print extension application determines whether a user operation for completing the print setting has been received. If the user operation for completing the print setting has been received (YES in step S1809), the processing proceeds to step S1810. If the user operation for completing the print setting has not been received (NO in step S1809), the print extension application waits for a print setting operation to be made via the screen of the print extension application.

In step S1810, the print extension application updates the attribute information managed by the OS based on the print setting that is made via the screen and is to be applied to the print job. After completion of the updating, the print extension application interrupts the operation of the print extension application itself. The print client of the OS that has detected that the operation of the print extension application is interrupted displays the print setting screen based on the updated print setting. At this time, the print client ignores attribute information that is not supported by the print client, and displays the print setting screen.

In step S1811, the OS determines whether a print start instruction has been made via the print setting screen. If the print start instruction has been made (YES in step S1811), the processing proceeds to step S1812. If the print start instruction has not been made (NO in step S1811), the processing returns to step S1806 to wait for a print setting operation.

In step S1812, the print client of the client terminal 104 generates a print job and transmits the generated print job to the CPS 102. It is assumed that the print job is generated by Create-Job operation or Print-Job operation defined in the IPP. In a case where the instruction is made by Print-Job operation, both of the attribute information and print data are transmitted. If the instruction is made by Create-Job operation, the print job is generated on the CPS 102 by Create-Job operation including print attributes. Then, processing for associating the generated print job with at least one piece of document data is performed using an operation for adding a document to be printed. At this time, the print client also transmits attribute information that is not supported by the print client to the CPS 102 as attribute information related to the print job. Accordingly, the attribute information updated by the print extension application is not discarded by the print client but is transmitted to the CPS 102. The processing described above makes it possible to support more flexible print settings.

Modified Examples

The present exemplary embodiment illustrates an example where print settings are made during print processing via the CPS. However, the present exemplary embodiment is not limited to this example. For example, the present exemplary embodiment can also be applied to a scan setting when scan data obtained by an MFP is transmitted to a personal computer (PC) of the user via the cloud. In this case, the MFP notifies a cloud scanning service of scanning capabilities corresponding to the full specification of the MFP when the MFP is registered on the cloud scanning service. At this time, the MFP notifies the cloud scanning service of capabilities including attributes unique to the vendor itself. The cloud scanning service registers a scanning capability that is not supported by the cloud scanning service itself on the cloud. A scanning client installed in the client terminal that uses the cloud scanning service acquires capability information corresponding to the full specification from the cloud scanning service. Then, the scanning client extracts the capability information supported by the scanning client from the full specification capability information and registers the extracted scanning capability information on a scanning framework. Assume that, when cloud scanning is applied to the second exemplary embodiment, a scanning extension application is downloaded from the distribution server and the downloaded scanning extension application is installed. In this case, high-performance optical character recognition (OCR) processing provided by the MFP, a scanned content summarization service provided by an artificial intelligence (AI) engine of the MFP, and the like can be set from an extension print setting screen for the scanning extension application.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A client terminal connectable via Internet with a cloud print service capable of registering information about a printing apparatus including information on a first attribute that is defined in Internet Printing Protocol (IPP) standard and information on a second attribute that is not defined in the IPP standard, the client terminal comprising:
   one or more processors that execute a set of instructions, the instructions, when executed, causing the client terminal to perform operations comprising:
      acquiring information on the first attribute and information on the second attribute, which are based on the information about the printing apparatus registered in the cloud print service, from the cloud print service by using a first IPP operation;
      setting first print setting information based on the acquired information on the first attribute and second print setting information based on the acquired information on the second attribute; and
      providing, to the cloud print service, the set first print setting information and the set second print setting information by using a second IPP operation.

2. The client terminal according to claim 1, wherein an attribute name of the first attribute that is defined in the IPP standard is described in the IPP standard and an attribute name of the second attribute that is not defined in the IPP standard is not described in the IPP standard.

3. The client terminal according to claim 1, wherein the cloud print service is a cloud print service that is connected to the client terminal and the printing apparatus via the Internet.

4. A control method for a client terminal connectable via Internet with a cloud print service capable of registering information about a printing apparatus including information on a first attribute that is defined in Internet Printing Protocol (IPP) standard and information on a second attribute that is not defined in the IPP standard, the control method comprising:
   causing the client terminal to acquire information on the first attribute and information on the second attribute, which are based on the information about the printing apparatus registered in the cloud print service, from the cloud print service by using a first IPP operation;
   causing the client terminal to set first print setting information based on the acquired information on the first attribute and second print setting information based on the acquired information on the second attribute; and
   causing the client terminal to provide, to the cloud print service, the set first print setting information and the set second print setting information by using a second IPP operation.

5. The control method according to claim 4, wherein an attribute name of the first attribute that is defined in the IPP standard is described in the IPP standard and an attribute name of the second attribute that is not defined in the IPP standard is not described in the IPP standard.

6. The control method according to claim 4, wherein the cloud print service is a cloud print service that is connected to the client terminal and the printing apparatus via the Internet.

7. A non-transitory computer-readable storage medium storing executable instructions, which when executed by one or more processors of a client terminal, cause the client terminal to perform a method, the client terminal connectable via Internet with a cloud print service capable of registering information about a printing apparatus including information on a first attribute that is defined in Internet Printing Protocol (IPP) standard and information on a second attribute that is not defined in the IPP standard, the method comprising:
   causing the client terminal to acquire information on the first attribute and information on the second attribute, which are based on the information about the printing apparatus registered in the cloud print service, from the cloud print service by using a first IPP operation;
   causing the client terminal to set first print setting information based on the acquired information on the first attribute and second print setting information based on the acquired information on the second attribute; and
   causing the client terminal to provide, to the cloud print service, the set first print setting information and the set second print setting information by using a second IPP operation.

8. The non-transitory computer-readable storage medium according to claim 7, wherein an attribute name of the first attribute that is defined in the IPP standard is described in the IPP standard and an attribute name of the second attribute that is not defined in the IPP standard is not described in the IPP standard.

9. The non-transitory computer-readable storage medium according to claim 7, wherein the cloud print service is a cloud print service that is connected to the client terminal and the printing apparatus via the Internet.

10. A system comprising:
   a printing apparatus configured to transmit information about the printing apparatus including information on a first attribute that is defined in Internet Printing Protocol (IPP) standard and information on a second attribute that is not defined in the IPP standard, by using a first IPP operation; and
   a client terminal connectable with a cloud print service capable of registering the information about the printing apparatus received from the printing apparatus,
   wherein the client terminal comprises:
   one or more processors that execute a set of instructions, the instructions, when executed, causing the client terminal to perform operations comprising:
      acquiring information on the first attribute and information on the second attribute, which are based on the information about the printing apparatus registered in the cloud print service, from the cloud print service by using a second IPP operation;
      setting first print setting information based on the acquired information on the first attribute and second print setting information based on the acquired information on the second attribute; and
      providing, to the cloud print service, the set first print setting information and the set second print setting information, by using a third IPP operation, and
   wherein the printing apparatus comprises:

one or more processors that execute a set of instructions, the instructions, when executed, causing the printing apparatus to perform operations comprising:

acquiring the first print setting information and the second print setting information from the cloud print service by using a fourth IPP operation; and executing a print job based on the first print setting information acquired from the cloud print service and the second print setting information acquired from the cloud print service.

11. A control method for a system, the system including a printing apparatus and a client terminal, the printing apparatus configured to transmit information about the printing apparatus including information on a first attribute that is defined in Internet Printing Protocol (IPP) standard and information on a second attribute that is not defined in the IPP standard, by using a first IPP operation, the client terminal connectable with a cloud print service capable of registering the information about the printing apparatus received from the printing apparatus, wherein the control method comprises:

causing the client terminal to acquire information on the first attribute and information on the second attribute, which are based on the information about the printing apparatus registered in the cloud print service, from the cloud print service by using a second IPP operation;

causing the client terminal to set first print setting information based on the acquired information on the first attribute and second print setting information based on the acquired information on the second attribute;

causing the client terminal to provide, to the cloud print service, the set first print setting information and the set second print setting information by using a third IPP operation;

causing the printing apparatus to acquire the first print setting information and the second print setting information from the cloud print service by using a fourth IPP operation; and causing the printing apparatus to execute a print job based on the first print setting information acquired from the cloud print service and the second print setting information acquired from the cloud print service.

* * * * *